United States Patent
Halliday et al.

(10) Patent No.: US 8,033,211 B2
(45) Date of Patent: *Oct. 11, 2011

(54) INSERT, A MACHINE AND A SYSTEM FOR THE PREPARATION OF BEVERAGES

(75) Inventors: Andrew Michael Halliday, Hook Norton (GB); Nicholas Andrew Hansen, Oxfordshire (GB); Colin Darrel Ballard, Chiltenham (GB); Satwinder Singh Panesar, Banbury (GB)

(73) Assignee: Kraft Foods R & D, Inc., Northfield, IL (US)

( * ) Notice: Subject to any disclaimer, the term of this patent is extended or adjusted under 35 U.S.C. 154(b) by 1254 days.

This patent is subject to a terminal disclaimer.

(21) Appl. No.: 10/589,459

(22) Filed: Aug. 14, 2006

(65) Prior Publication Data

US 2007/0163446 A1 Jul. 19, 2007

(30) Foreign Application Priority Data

Feb. 17, 2004 (GB) .................................. 0403493.0

(51) Int. Cl.
*A47J 31/00* (2006.01)
*A23L 1/00* (2006.01)
(52) U.S. Cl. .............................. 99/295; 99/279; 99/285
(58) Field of Classification Search .................... 99/295, 99/280, 290, 289 R, 302 R, 282, 285
See application file for complete search history.

(56) References Cited

U.S. PATENT DOCUMENTS

| | | |
|---|---|---|
| 1,576,735 A | 3/1926 | Fessenden |
| 2,715,868 A | 8/1955 | Brown |
| 2,778,739 A | 1/1957 | Rodth |
| 2,899,106 A | 8/1959 | Weinert |
| 3,083,101 A | 3/1963 | Noury |

(Continued)

FOREIGN PATENT DOCUMENTS

EP 0 057 671 A2 8/1982

(Continued)

OTHER PUBLICATIONS

The United Kingdom Patent Office Combined Search and Examination Report for GB 0301709.2 dated May 8, 2003.

(Continued)

*Primary Examiner* — Henry Yuen
*Assistant Examiner* — Jianying Atkisson
(74) *Attorney, Agent, or Firm* — Fitch, Even, Tabin & Flannery

(57) ABSTRACT

An insert for use in a beverage preparation machine of a type comprising a brew head suitable for receiving a rigid or semi-rigid cartridge. The brew head comprises an upwardly directed inlet for supplying water to the brew head and a downwardly directed outlet for outflow of beverage produced by the machine, the insert comprises an upper part, a lower part and sealing means, the upper and lower parts being moveable between an open configuration in which a quantity of beverage ingredients may be loaded into the insert and a closed configuration in which the upper and lower parts are sealed together by the sealing means to define therebetween a brewing volume containing, in use, the quantity of beverage ingredients, the lower part passes upwardly through the inlet of the insert into the brewing volume and such that beverage produced from the water and the quantity of beverage ingredients passes downwardly through the outlet of the insert to flow out of the outlet of the brew head.

50 Claims, 19 Drawing Sheets

U.S. PATENT DOCUMENTS

| | | |
|---|---|---|
| 3,336,857 A | 8/1967 | Knodt et al. |
| 3,403,617 A | 10/1968 | Lampe |
| 3,790,029 A | 2/1974 | Ward |
| 3,823,656 A | 7/1974 | Vander Veken |
| D255,529 S | 6/1980 | Dziekonski |
| 4,382,402 A | 5/1983 | Alvarez |
| 4,389,191 A | 6/1983 | Lowe |
| 4,452,130 A | 6/1984 | Klein |
| 4,471,689 A | 9/1984 | Piana |
| 4,484,515 A | 11/1984 | Illy |
| 4,551,611 A | 11/1985 | Longo |
| 4,653,390 A | 3/1987 | Hayes |
| 4,724,752 A | 2/1988 | Aliesch et al. |
| 4,738,378 A | 4/1988 | Oakley et al. |
| 4,744,291 A | 5/1988 | Wallin |
| 4,775,048 A | 10/1988 | Baecchi et al. |
| 4,787,299 A | 11/1988 | Levi et al. |
| 4,806,375 A | 2/1989 | Favre |
| 4,818,544 A | 4/1989 | Seward |
| 4,838,152 A | 6/1989 | Kubicko et al. |
| 4,846,052 A | 7/1989 | Favre et al. |
| 4,853,234 A | 8/1989 | Bentley et al. |
| 4,873,915 A | 10/1989 | Newman et al. |
| 4,875,408 A | 10/1989 | McGee |
| 4,876,953 A | 10/1989 | Imamura et al. |
| 4,886,674 A | 12/1989 | Seward et al. |
| 4,917,005 A | 4/1990 | Knepler |
| 4,920,870 A | 5/1990 | Newman et al. |
| 4,921,712 A | 5/1990 | Malmquist |
| 4,983,410 A * | 1/1991 | Dinos ............................. 426/77 |
| 4,990,352 A | 2/1991 | Newman et al. |
| 5,014,611 A | 5/1991 | Illy et al. |
| 5,063,836 A | 11/1991 | Patel |
| 5,072,660 A | 12/1991 | Helbling |
| 5,082,676 A | 1/1992 | Love et al. |
| 5,111,740 A | 5/1992 | Klein |
| 5,134,924 A | 8/1992 | Vicker |
| 5,178,058 A | 1/1993 | van Dort et al. |
| 5,183,998 A | 2/1993 | Hoffman et al. |
| 5,186,096 A | 2/1993 | Willi |
| 5,197,374 A | 3/1993 | Fond |
| 5,242,702 A | 9/1993 | Fond |
| 5,259,295 A | 11/1993 | Timm |
| 5,265,520 A | 11/1993 | Giuliano |
| 5,272,960 A | 12/1993 | Kinna |
| 5,285,717 A | 2/1994 | Knepler |
| 5,287,797 A | 2/1994 | Grykiewicz et al. |
| 5,303,639 A | 4/1994 | Bunn et al. |
| 5,325,765 A | 7/1994 | Sylvan et al. |
| 5,327,815 A | 7/1994 | Fond et al. |
| 5,343,799 A | 9/1994 | Fond |
| 5,347,916 A | 9/1994 | Fond et al. |
| 5,349,897 A | 9/1994 | King et al. |
| 5,375,508 A | 12/1994 | Knepler et al. |
| 5,398,595 A | 3/1995 | Fond et al. |
| 5,398,596 A | 3/1995 | Fond |
| 5,408,917 A | 4/1995 | Lussi |
| 5,440,972 A | 8/1995 | English |
| 5,455,887 A | 10/1995 | Dam |
| 5,463,932 A | 11/1995 | Olson |
| 5,472,719 A | 12/1995 | Favre |
| 5,479,849 A | 1/1996 | King et al. |
| 5,531,152 A | 7/1996 | Gardosi |
| 5,531,604 A | 7/1996 | Huang |
| 5,549,035 A | 8/1996 | Wing-Chung |
| 5,603,254 A | 2/1997 | Fond et al. |
| 5,637,335 A | 6/1997 | Fond et al. |
| 5,638,740 A | 6/1997 | Cai |
| 5,638,741 A | 6/1997 | Cisaria |
| 5,639,023 A | 6/1997 | Hild et al. |
| 5,649,412 A | 7/1997 | Binacchi |
| 5,649,472 A | 7/1997 | Fond et al. |
| 5,704,275 A | 1/1998 | Warne |
| 5,738,001 A | 4/1998 | Liverani |
| 5,762,987 A | 6/1998 | Fond et al. |
| 5,776,527 A | 7/1998 | Blanc |
| 5,794,519 A | 8/1998 | Fischer |
| 5,826,492 A | 10/1998 | Fond et al. |
| 5,840,189 A | 11/1998 | Sylvan et al. |
| 5,858,437 A | 1/1999 | Anson |
| 5,862,738 A | 1/1999 | Warne |
| 5,895,672 A | 4/1999 | Cooper |
| 5,897,899 A | 4/1999 | Fond |
| 5,899,137 A | 5/1999 | Miller et al. |
| 5,921,168 A | 7/1999 | Nello |
| 5,948,455 A | 9/1999 | Schaeffer et al. |
| 5,967,021 A | 10/1999 | Yung |
| 5,974,950 A | 11/1999 | King |
| 5,992,298 A | 11/1999 | Illy et al. |
| 6,000,317 A | 12/1999 | Van Der Meer |
| 6,006,653 A | 12/1999 | Sham et al. |
| 6,009,792 A | 1/2000 | Kraan |
| D419,821 S | 2/2000 | Powell et al. |
| 6,021,705 A | 2/2000 | Dijs |
| 6,025,000 A | 2/2000 | Fond et al. |
| D423,863 S | 5/2000 | Lupi |
| 6,062,127 A | 5/2000 | Klosinski et al. |
| 6,068,871 A | 5/2000 | Fond et al. |
| 6,082,245 A | 7/2000 | Nicolai |
| 6,095,031 A | 8/2000 | Warne |
| 6,109,168 A | 8/2000 | Illy et al. |
| 6,117,471 A | 9/2000 | King |
| 6,142,063 A | 11/2000 | Beaulieu et al. |
| 6,170,386 B1 | 1/2001 | Paul |
| 6,173,117 B1 | 1/2001 | Clubb |
| 6,178,874 B1 | 1/2001 | Joergensen |
| 6,182,554 B1 | 2/2001 | Beaulieu et al. |
| 6,186,051 B1 | 2/2001 | Aarts |
| D443,792 S | 6/2001 | Peters et al. |
| 6,240,832 B1 | 6/2001 | Schmed et al. |
| 6,240,833 B1 | 6/2001 | Sham et al. |
| 6,245,371 B1 | 6/2001 | Gutwein et al. |
| 6,279,459 B1 | 8/2001 | Mork et al. |
| 6,289,948 B1 | 9/2001 | Jeannin et al. |
| D452,107 S | 12/2001 | Cahen |
| 6,347,725 B1 | 2/2002 | Yoakim et al. |
| 6,358,545 B1 | 3/2002 | Chandler et al. |
| 6,405,637 B1 | 6/2002 | Cai |
| D459,628 S | 7/2002 | Cahen |
| D460,653 S | 7/2002 | Cahen |
| D461,358 S | 8/2002 | Cahen |
| 6,499,388 B2 | 12/2002 | Schmed |
| D475,567 S | 6/2003 | Hsu |
| 6,606,938 B2 | 8/2003 | Taylor |
| 6,607,762 B2 | 8/2003 | Lazaris et al. |
| D479,939 S | 9/2003 | Au |
| 6,612,224 B2 | 9/2003 | Mercier et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,698,332 B2 | 3/2004 | Kollep et al. |
| 6,698,333 B2 | 3/2004 | Halliday et al. |
| D489,930 S | 5/2004 | Tse |
| 6,758,130 B2 | 7/2004 | Sargent et al. |
| 6,777,007 B2 * | 8/2004 | Cai ............................. 426/78 |
| 6,786,136 B2 | 9/2004 | Cirigliano et al. |
| 6,857,353 B2 | 2/2005 | Kollep et al. |
| 6,935,222 B2 | 8/2005 | Chen et al. |
| 6,968,775 B2 * | 11/2005 | Burrows et al. ................. 99/303 |
| 2001/0048957 A1 | 12/2001 | Lazaris et al. |
| 2002/0002913 A1 | 1/2002 | Mariller et al. |
| 2002/0015768 A1 | 2/2002 | Masek et al. |
| 2002/0023543 A1 | 2/2002 | Schmed |
| 2002/0048621 A1 | 4/2002 | Boyd et al. |
| 2002/0078831 A1 | 6/2002 | Cai |
| 2002/0088807 A1 | 7/2002 | Perkovic et al. |
| 2002/0121197 A1 | 9/2002 | Mercier et al. |
| 2002/0121198 A1 | 9/2002 | Kollep et al. |
| 2002/0124736 A1 | 9/2002 | Kollep et al. |
| 2002/0129712 A1 | 9/2002 | Westbrook et al. |
| 2002/0144603 A1 | 10/2002 | Taylor |
| 2002/0144604 A1 | 10/2002 | Winkler et al. |
| 2002/0148356 A1 | 10/2002 | Lazaris et al. |
| 2002/0148357 A1 | 10/2002 | Lazaris et al. |
| 2003/0005826 A1 | 1/2003 | Sargent et al. |
| 2003/0039731 A1 | 2/2003 | Dalton et al. |
| 2003/0056655 A1 | 3/2003 | Kollep et al. |

| | | | |
|---|---|---|---|
| 2003/0145736 | A1 | 8/2003 | Green |
| 2003/0222089 | A1 | 12/2003 | Hale |
| 2004/0197444 | A1 * | 10/2004 | Halliday et al. ............. 426/112 |

FOREIGN PATENT DOCUMENTS

| | | |
|---|---|---|
| EP | 0 151 252 A1 | 8/1985 |
| EP | 0 272 922 A2 | 6/1988 |
| EP | 0 334 571 A1 | 9/1989 |
| EP | 0 334 572 A1 | 9/1989 |
| EP | 0 449 533 A1 | 10/1991 |
| EP | 0 451 980 A2 | 10/1991 |
| EP | 0 455 337 A1 | 11/1991 |
| EP | 0 469 162 A1 | 2/1992 |
| EP | 0 521 510 A1 | 1/1993 |
| EP | 0 524 464 A1 | 1/1993 |
| EP | 0 638 486 A1 | 2/1995 |
| EP | 0 604 615 B1 | 9/1998 |
| EP | 0 862 882 A1 | 9/1998 |
| EP | 0 870 457 A1 | 10/1998 |
| EP | 0 904 718 A1 | 3/1999 |
| EP | 0 730 425 B1 | 5/1999 |
| EP | 0 756 844 B1 | 5/1999 |
| EP | 1 042 978 A1 | 10/2000 |
| EP | 1 090 574 A1 | 4/2001 |
| EP | 1 095 605 A1 | 5/2001 |
| EP | 1 101 430 A1 | 5/2001 |
| EP | 1 153 561 A1 | 11/2001 |
| EP | 1 208 782 A1 | 5/2002 |
| EP | 0 862 882 B1 | 7/2002 |
| EP | 1 316 283 A2 | 6/2003 |
| EP | 1 255 685 B1 | 4/2004 |
| FR | 1 537 031 | 8/1968 |
| FR | 2 322 796 A1 | 4/1977 |
| GB | 468 248 A | 7/1937 |
| GB | 828 529 A | 2/1960 |
| GB | 1 215 840 A | 12/1970 |
| GB | 2 306 432 A | 5/1997 |
| GB | 2 374 795 A | 10/2002 |
| GB | 2 374 816 A | 10/2002 |
| GB | 2 374 856 A | 10/2002 |
| GB | 2 379 624 A | 3/2003 |
| JP | 2000-93309 | 4/2000 |
| WO | 88/07472 A1 | 10/1988 |
| WO | 95/07648 A1 | 3/1995 |
| WO | 95/16377 A1 | 6/1995 |
| WO | 97/17006 A1 | 5/1997 |
| WO | 98/27854 A1 | 7/1998 |
| WO | 00/28868 A1 | 5/2000 |
| WO | 00/42891 A1 | 7/2000 |
| WO | 01/15582 A1 | 3/2001 |
| WO | 01/30218 A1 | 5/2001 |
| WO | 01/58786 A1 | 8/2001 |
| WO | 01/60219 A1 | 8/2001 |
| WO | 01/60220 A1 | 8/2001 |
| WO | 01/82760 A1 | 11/2001 |
| WO | 02/19875 A1 | 3/2002 |
| WO | 02/28241 A1 | 4/2002 |
| WO | 02/074143 A2 | 9/2002 |
| WO | 02/074661 A1 | 9/2002 |
| WO | 02/082962 A1 | 10/2002 |
| WO | 02/085170 A2 | 10/2002 |
| WO | 02/087400 A1 | 11/2002 |
| WO | 02/092439 A2 | 11/2002 |
| WO | 02/085170 A3 | 3/2003 |
| WO | 03/026470 A2 | 4/2003 |
| WO | 03/039309 A1 | 5/2003 |
| WO | 03/059778 A2 | 7/2003 |
| WO | 03/065859 A2 | 8/2003 |
| WO | 03/065859 A3 | 12/2003 |
| WO | 03/059778 A3 | 1/2004 |

OTHER PUBLICATIONS

The United Kingdom Patent Office Combined Search and Examination Report for GB 0301702.7 dated May 16, 2003.
The United Kingdom Patent Office Combined Search and Examination Report for GB 0301696.1 dated May 27, 2003.
The United Kingdom Patent Office Combined Search and Examination Report for GB 0301747.2 dated May 30, 2003.
The United Kingdom Patent Office Combined Search and Examination Report for GB 0301738.1 dated Jun. 9, 2003.
The United Kingdom Patent Office Combined Search and Examination Report for GB 0301708.4 dated Jun. 12, 2003.
The United Kingdom Patent Office Combined Search and Examination Report for GB 0301710.0 dated Jun. 12, 2003.
The United Kingdom Patent Office Combined Search and Examination Report for GB 0301679.7 dated Jun. 16, 2003.
The United Kingdom Patent Office Combined Search and Examination Report for GB 0301698.7 dated Jun. 16, 2003.
The United Kingdom Patent Office Combined Search and Examination Report for GB 0301741.5 dated Jun. 16, 2003.
The United Kingdom Patent Office Combined Search and Examination Report for GB 0301739.9 dated Jun. 17, 2003.
The United Kingdom Patent Office Combined Search and Examination Report for GB 0301745.6 dated Jun. 17, 2003.
The United Kingdom Patent Office Combined Search and Examination Report for GB 0301680.5 dated Jun. 19, 2003.
The United Kingdom Patent Office Combined Search and Examination Report for GB 0301681.3 dated Jun. 24, 2003.
The United Kingdom Patent Office Combined Search and Examination Report for GB 0301733.2 dated Jun. 27, 2003.
The United Kingdom Patent Office Combined Search and Examination Report for GB 0301734.0 dated Jun. 27, 2003.
The United Kingdom Patent Office Combined Search and Examination Report for GB 0301735.7 dated Jul. 4, 2003.
The United Kingdom Patent Office Combined Search and Examination Report for GB 0301713.4 dated Jul. 16, 2003.
European Patent Office Search Report for EP 04 25 0366.4 dated Mar. 18, 2004.
European Patent Office Search Report for EP 04 25 0362.3 dated Mar. 22, 2004.
European Patent Office Search Report for EP 04 25 0376.3 dated Mar. 23, 2004.
European Patent Office Search Report for EP 04 25 0361.5 dated May 4, 2004.
European Patent Office Search Report for EP 04 25 0360.7 dated May 7, 2004.
European Patent Office Search Report for EP 04 25 0365.6 dated May 7, 2004.
European Patent Office Search Report for EP 04 25 0377.1 dated May 7, 2004.
European Patent Office Search Report for EP 04 25 0381.3 dated May 7, 2004.
European Patent Office Search Report for EP 04 25 0382.1 dated May 7, 2004.
European Patent Office Search Report for EP 04 25 0384.7 dated May 7, 2004.
European Patent Office Search Report for EP 04 25 0380.5 dated May 10, 2004.
European Patent Office Search Report for EP 04 25 0357.3 dated May 11, 2004.
European Patent Office Partial European Search Report for EP 04 25 0364.9 dated May 11, 2004.
European Patent Office Search Report for EP 04 25 0363.1 dated May 17, 2004.
European Patent Office Search Report for EP 04 25 0389.6 dated May 17, 2004.
European Patent Office Search Report for EP 04 25 0383.9 dated May 28, 2004.
European Patent Office Search Report for EP 04 25 0388.8 dated Jun. 1, 2004.
European Patent Office Search Report for EP 04 25 0390.4 dated Jun. 17, 2004.
PCT Invitation to Pay Additional Fees and Communication Relating to the Results of the Partial International Search for PCT/GB2004/000272 dated May 11, 2004.
PCT International Search Report and Written Opinion of the International Searching Authority for PCT/GB2004/000273 dated May 12, 2004.
PCT International Search Report and Written Opinion of the International Searching Authority for PCT/GB2004/000279 dated May 17, 2004.

PCT International Search Report and Written Opinion of the International Searching Authority for PCT/GB2004/000268 dated May 24, 2004.

PCT Invitation to Pay Additional Fees and Communication Relating to the Results of the Partial International Search for PCT/GB2004/000276 dated May 24, 2004.

PCT International Search Report and Written Opinion of the International Searching Authority for PCT/GB2004/000282 dated Jun. 3, 2004.

PCT International Search Report and Written Opinion of the International Searching Authority for PCT/GB2004/000287 dated Jun. 16, 2004.

PCT Invitation to Pay Additional Fees and Communication Relating to the Results of the Partial International Search for PCT/GB2004/000265 dated Jun. 17, 2004.

PCT International Search Report and Written Opinion of the International Searching Authority for PCT/GB2004/000272 dated Sep. 7, 2004.

PCT International Search Report and Written Opinion of the International Searching Authority for PCT/GB2004/000276 dated Sep. 7, 2004.

* cited by examiner

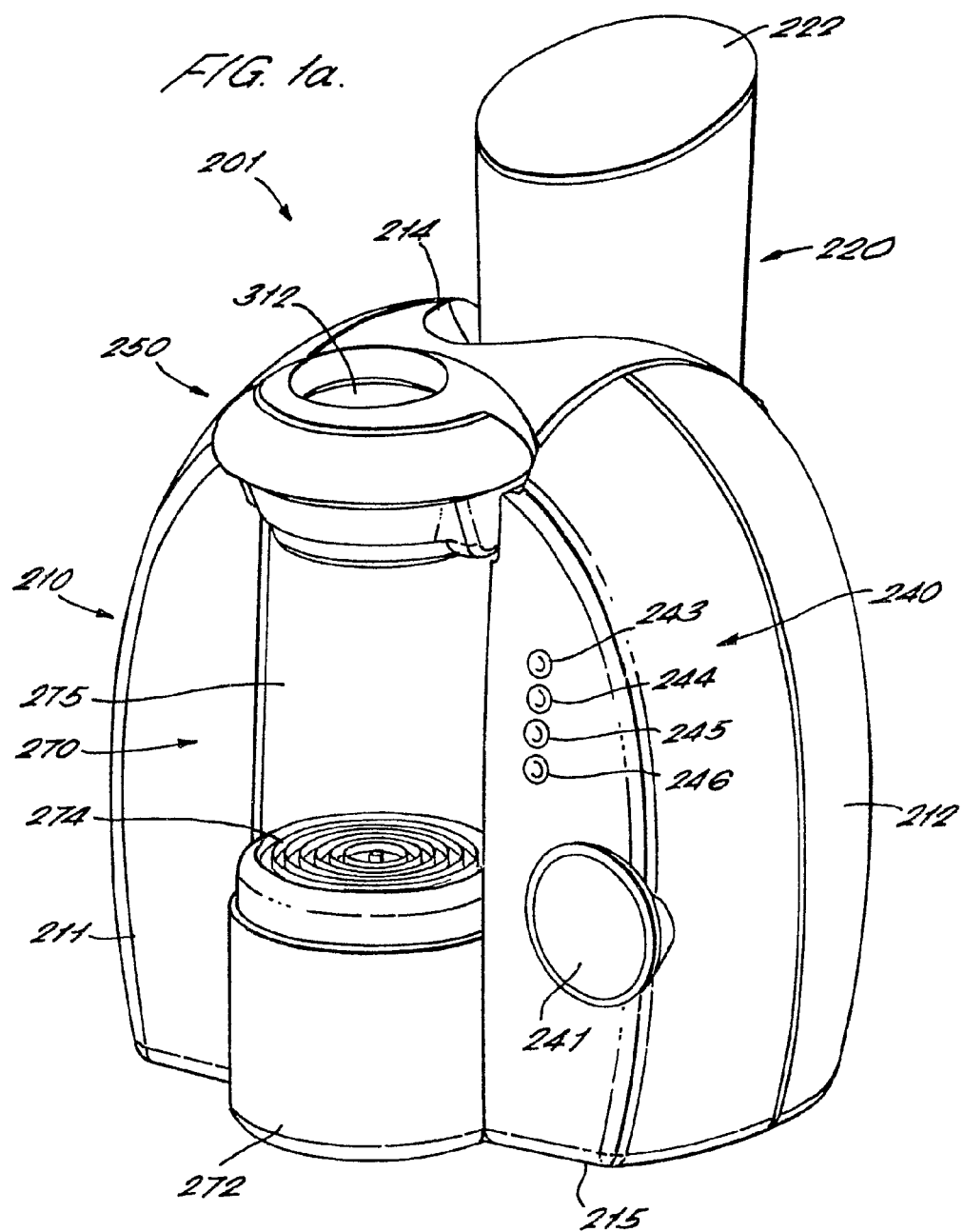

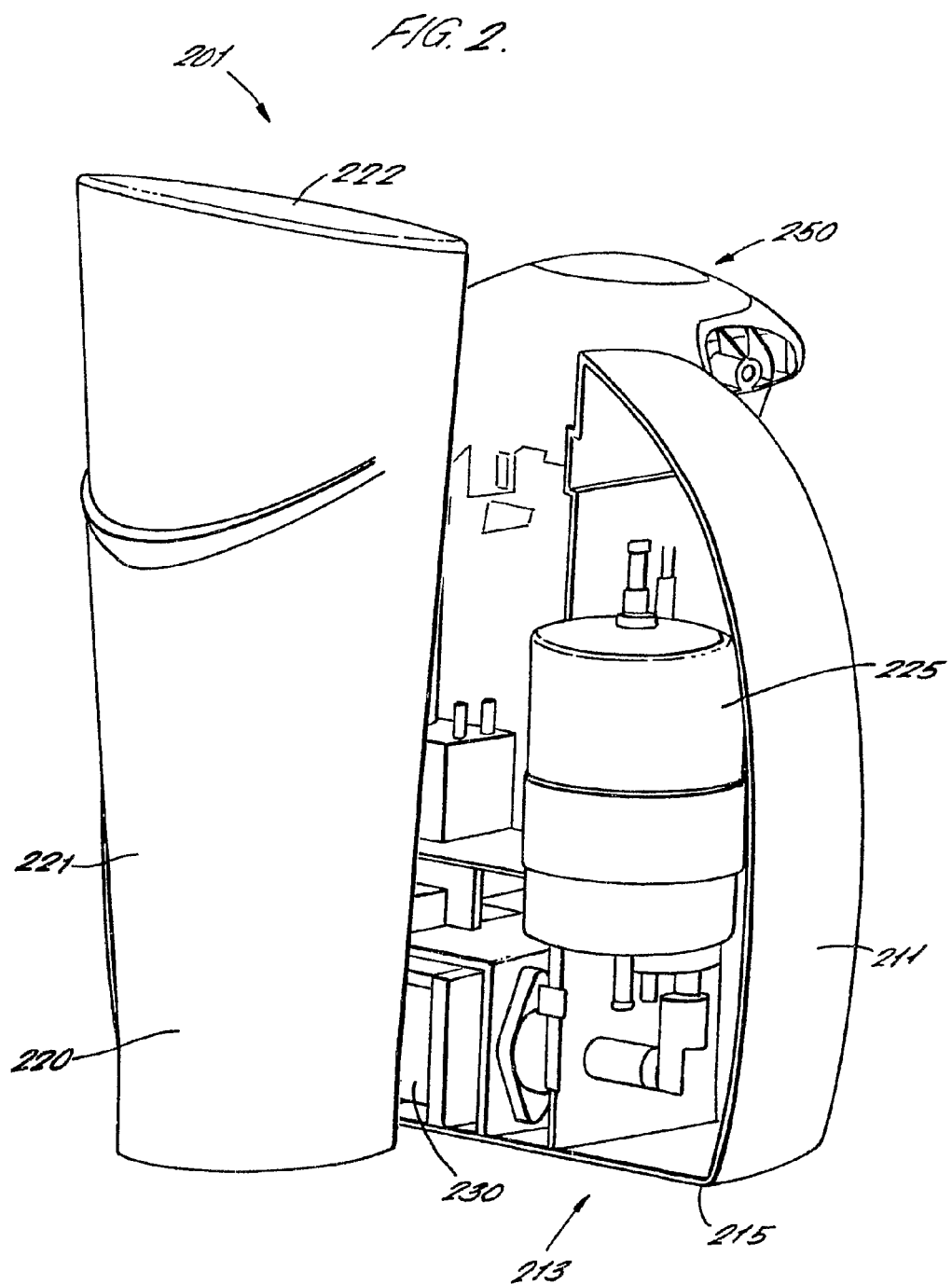

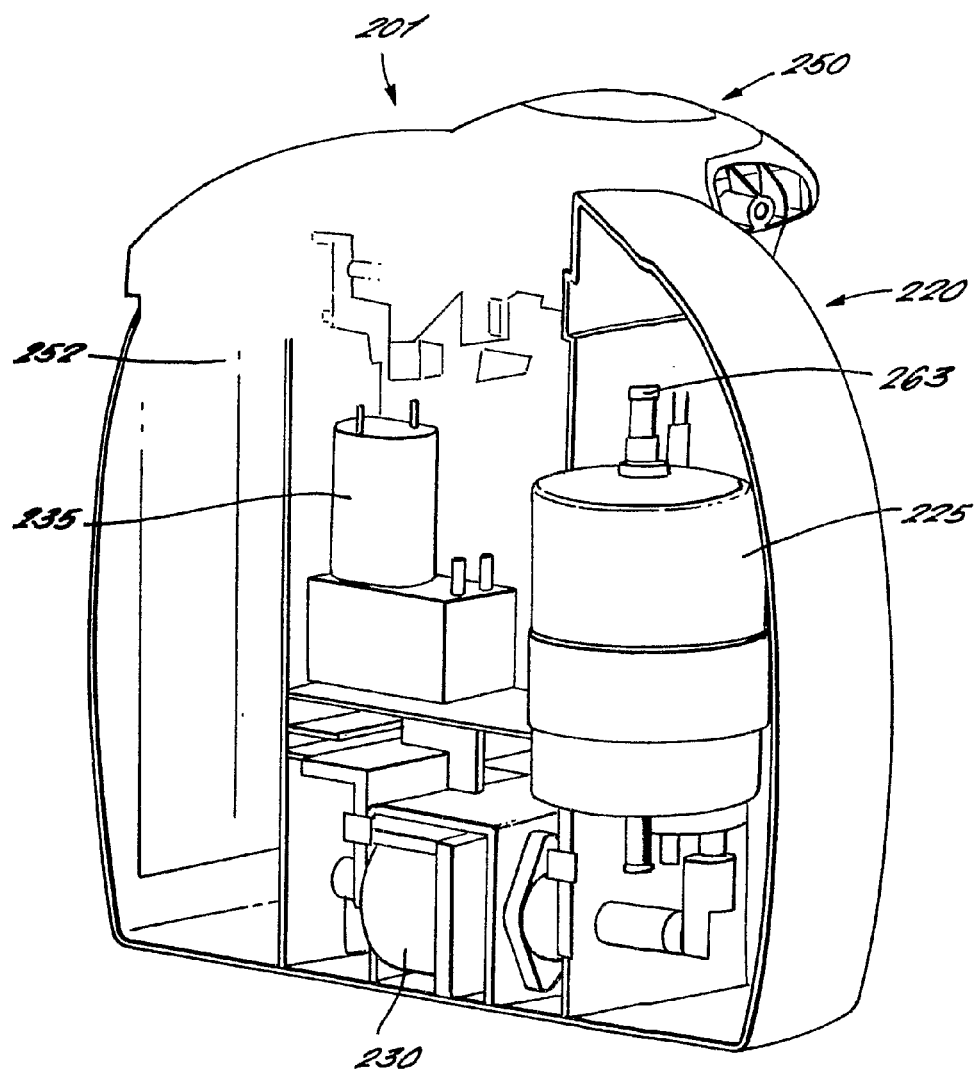

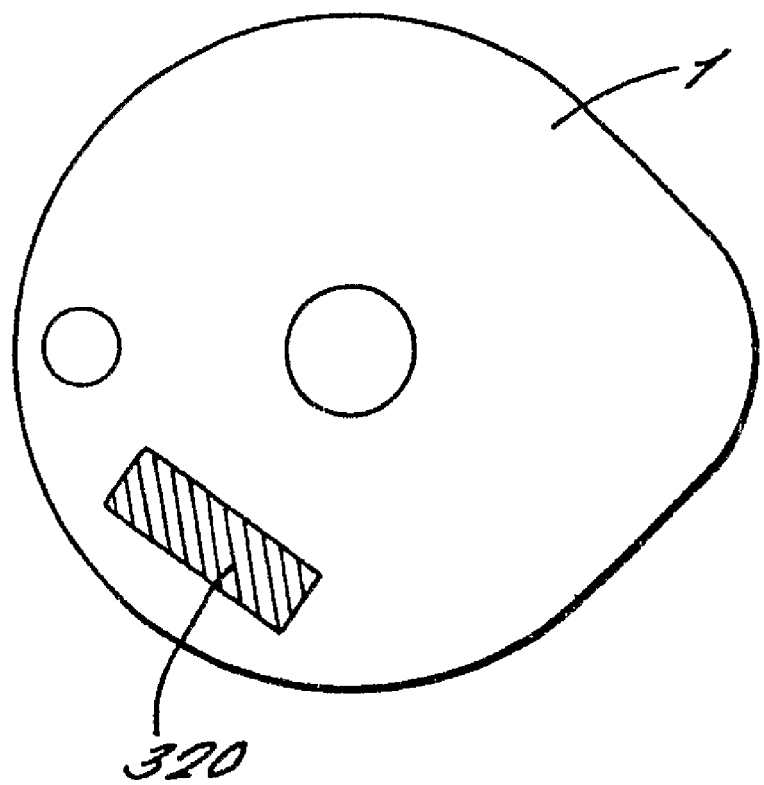

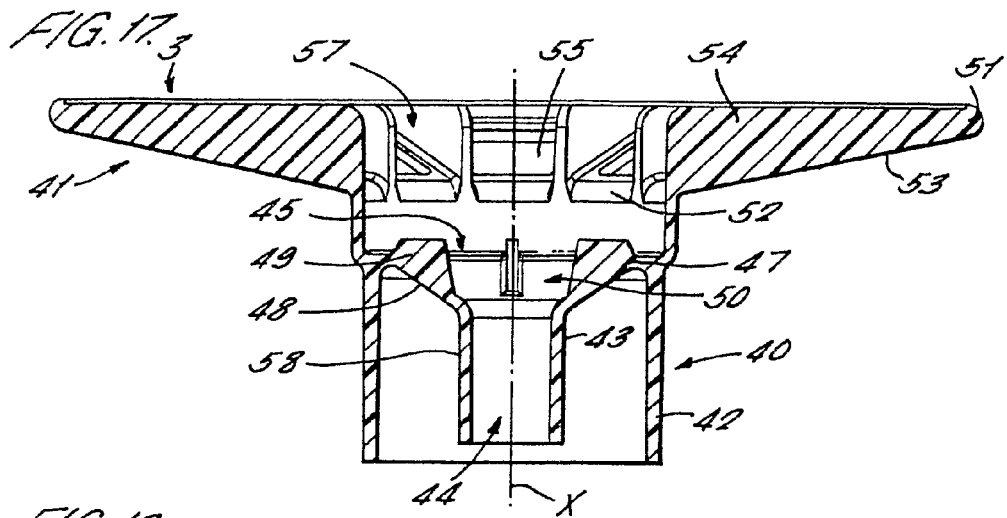
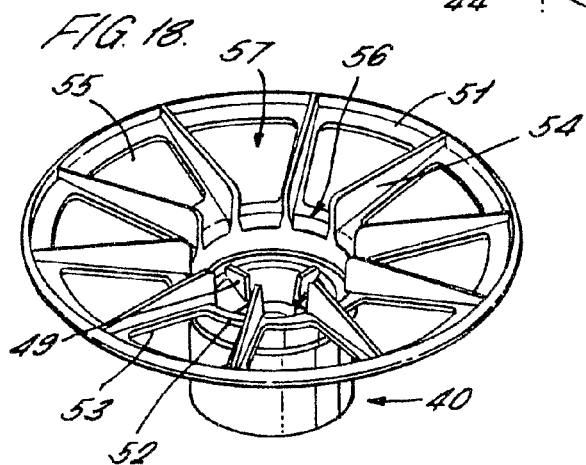
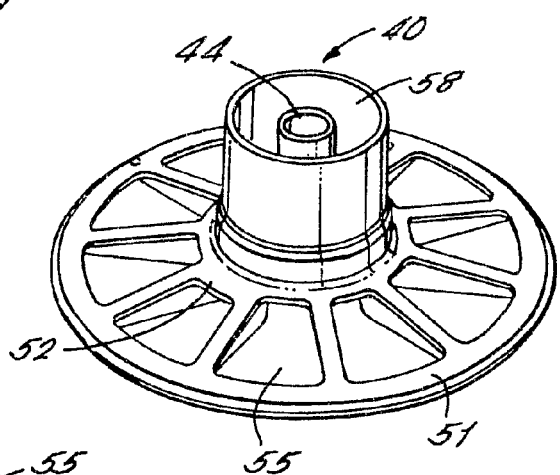
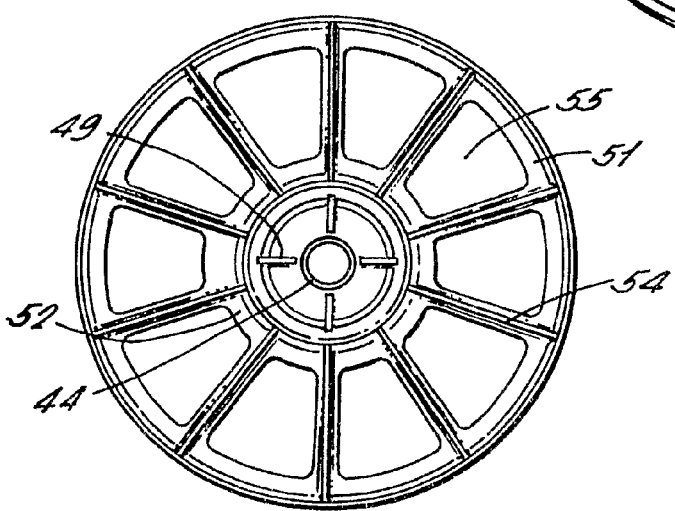

INSERT, A MACHINE AND A SYSTEM FOR THE PREPARATION OF BEVERAGES

The present invention relates to an insert, a machine and a system for the preparation of beverages.

It is known to provide machines and systems for the preparation of beverages such as coffee, tea and chocolate. Typically, in such systems the beverage ingredients are used either in a loose form or contained in a container. It is known in some machines to use flexible containers, such as filter paper bags containing roast and ground coffee or leaf tea. It is also known in other machines to use containers in the form of cartridges which may be rigid, semi-rigid, or flexible and which are pierced during preparation of the beverage. In both cases, the machine fox use with such containers is specially adapted to receive a particular design of container in a brew head and to pass water and/or steam through the container to prepare a beverage which is then dispensed. Such beverage preparation machine may be used in commercial or domestic markets. In the domestic market consumers may not wish to use separate machines when preparing beverages from different beverage ingredient containing containers or, indeed, loose beverage ingredients. It is therefore an object of the present invention to provide an insert, a beverage preparation machine and a beverage preparation system which allows consumers to use a variety of containers or loose ingredients in a single beverage preparation machine. In one aspect, it is an object of the present invention to provide an insert for a beverage preparation machine which is primarily designed for use with cartridges, whether rigid, semi-rigid or flexible, that allows the beverage preparation machine to dispense beverage ingredients from flexible containers such as filter bags.

Accordingly, the present invention provides an insert for use in a beverage preparation machine of a type comprising a brew head suitable for receiving a rigid or semi-rigid cartridge, the brew head comprising an upwardly directed inlet for supplying water to the brew head and a downwardly directed outlet for outflow of beverage produced by the machine, the insert comprising an upper part, a lower part and sealing means, the upper and lower parts being moveable between an open configuration in which a quantity of beverage ingredients may be loaded into the insert and a closed configuration in which the upper and lower parts are sealed together by the sealing means to define therebetween a brewing volume containing, in use, the quantity of beverage ingredients, the lower part comprising an inlet and an outlet arranged to communicate respectively with the inlet and outlet of the brew head of the beverage preparation machine when the insert is inserted into the machine such that, in use, water from the inlet of the brew head passes upwardly through the inlet of the insert into the brewing volume and such that beverage produced from the water and the quantity of beverage ingredients passes downwardly through the outlet of the insert to flow out of the outlet of the brew head.

Advantageously, the insert allows a quantity of beverage ingredients to be dispensed from a beverage preparation machine designed to accommodate rigid, semi-rigid and flexible cartridges wherein the beverage ingredients are not necessarily contained in a cartridge. A The quantity of beverage ingredients loaded in use into the insert may be loose. For example, loose roast and ground coffee or leaf tea may be loaded into the insert. In this case it is preferred that the insert comprises filtering means between the brewing volume and the outlet of the insert. This prevents the grounds or leaves being dispensed into the cup. The filter may span between the upper and lower parts of the insert so as to surround the outlet of the insert. Alternatively, the filter may cover the outlet aperture itself.

In an alternative aspect the quantity of beverage ingredients loaded in use into the insert may be contained in a container comprising filtering means. The container may be flexible. The container may formed at least in part from a filter paper or filtering membrane. In a particular aspect the container is a filter bag. Advantageously, the insert allows beverage ingredients in filter bags or similar to be dispensed without the need for the bag to be correctly sized to the brew head.

In an alternative aspect the container is a rigid or semi-rigid cartridge. The cartridge may be any of semi-spherical, cylindrical, round or square in shape. The insert may itself contain a cartridge. This allows the beverage preparation machine to utilise cartridges which are not sized specifically for the brew head.

The sealing means may be located on or in the upper part of the insert. Alternatively, the sealing means may be located on or in the lower part of the insert.

In one embodiment, the sealing means comprises a ring seal for sealing around a periphery of the brewing volume. For example, the sealing means may comprise an O-ring.

Preferably, the sealing means is formed from an elastomeric material.

In one aspect the upper part and lower part are disconnected from one another. This may be advantageous in simplifying the loading process. The upper part and lower part may comprise co-operating formations to permit snap-fitting together of the upper part and lower part.

One or other of the upper or lower parts my be mounted or inserted semi-permanently in the brew head of the machine. In an alternative aspect the upper part and lower part are joined by a hinge allowing the upper and lower parts to move between the open and closed configurations. Advantageously, hinging the upper and lower parts helps to prevent one or other part being lost when the insert is removed from the machine.

The upper part of the insert is preferably rigid or semi-rigid such that pressure applied, in use, to the upper part of the insert by a closure mechanism of the beverage preparation machine on closing of said closure mechanism squeezes the upper and lower parts of the insert together with sufficient force for the sealing means to seal together the upper and lower parts. The force applied to seal the upper and lower parts by the closure mechanism prevents leakage of water or other fluid during dispensation.

The insert is preferably rigid or semi-rigid such that pressure applied, in use, to the upper part of the insert by a closure mechanism of the beverage preparation machine on closing of said closure mechanism seals the lower part of the insert against the inlet of the brew head of the beverage preparation machine. The force applied to seal the lower part against the inlet by the closure mechanism prevents leakage of water or other fluid during dispensation at the point where water enters the insert from the inlet of the brew head.

The upper part may be in the form of a domed shell.

In one aspect, the lower part of the insert is formed as one piece. Alternatively, the lower part of the insert may be formed from more than one piece.

The insert may be disc-shaped. Advantageously this maximises the capacity of the brewing volume that can be accommodated by the brew head.

The insert may be formed from plastic.

Preferably, the inlet and outlet of the insert are coplanar. This beneficially ensures good sealing against the brew head where the brew head is substantially planar. Alternatively, the inlet and outlet of the insert are not coplanar.

The insert may comprise an aperture for receiving on insertion of the insert in the beverage machine a window of a bar code reader or RFID reader of said machine. The aperture may be coplanar with the inlet and outlet of the insert.

The inlet of the insert may be located at or near a periphery of the lower part and the outlet of the insert may be located at a centre of the lower part. Consequently, in use, flow through the insert may be from the inlet to the outlet. Flow through the insert may be generally in an inward direction from the inlet to the outlet. Advantageously inward flow towards a central outlet allows the beverage preparation machine to have a particularly compact size.

The insert may further comprise means for rotatable attaching the insert to the beverage preparation machine.

The rotatable means may allow the insert to be rotated on closure of a closure mechanism of the beverage preparation machine into a horizontal orientation such that the lower part is sealed against the inlet of the brew head.

The rotatable means may comprise one or more legs which are attachable to, and rotatable about, one or more pivot points of the brew head.

The insert may also comprise coding means for controlling operation of said beverage preparation machine. The coding means may comprise a bar code or radio frequency identification device (RFID).

The present invention also provides a beverage preparation system comprising a beverage preparation machine and an insert for use in said machine, said insert being as described above.

The beverage preparation machine preferably comprises a brew head suitable for receiving a rigid or semi-rigid cartridge, the brew head comprising an upwardly directed inlet for supplying water to the brew head and a downwardly directed outlet for outflow of beverage produced by the machine. Advantageously the beverage preparation machine is particularly compact since the inflow into the insert is in an upward direction and the outflow is in a downward direction. This removes the requirement for the upper part of the brew head to be provided with and conduits for flow of water, beverage or power and results in a simpler construction of machine and a reduction in the overall height of the machine.

The inlet of the brew head may be located at or near a periphery of the brew head and the outlet of the brew head may be located at a centre of the brew head.

On insertion of the insert into the brew head, the inlet and outlet of the insert preferably lie on top of the upwardly directed inlet and downwardly directed outlet orifices of the brew head.

The brew head of the beverage preparation machine may comprise a closure mechanism moveable between an open configuration in which the insert can be inserted into the brew head and a closed configuration in which the insert is squeezed together by the closure mechanism with sufficient force for the sealing means of the insert to seal together the upper and lower parts of the insert.

The brew head of the beverage preparation machine may comprise a closure mechanism moveable between an open configuration in which the insert can be inserted into the brew head and a closed configuration in which the lower part of the insert is sealed against the inlet of the brew head of the beverage preparation machine.

The brew head may comprise a fixed lower part and a rotatable upper part, the fixed lower part comprising the brew head inlet and outlet, the upper part being rotatable from an open position in which the insert can be inserted into the brew head and a closed position in which the insert is engaged between the fixed lower part and the rotatable upper part.

The insert may be a rotatable attachment to the brew head such that rotation of the upper part of the brew head from the open to the closed position rotates the insert into contact with the fixed lower part.

The insert may be locatable directly onto the fixed lower part of the brew head when the upper part of the brew head is in the open position. The insert need not be attached to the brew head.

The beverage preparation machine may comprise a reader for detecting a bar code or radio frequency identification device (RFID) located on the insert.

The system may further comprise a quantity of beverage ingredients. In one aspect the quantity of beverage ingredients is contained in a container comprising filtering means. The beverage ingredients may be selected from the group containing roast and ground coffee, leaf tea, powdered coffee, powdered tea, creamer, cappuccino mix, chocolate and liquid chocolate, coffee, tea and milk. The container may be flexible. The container may be formed at least in part from a filter paper or filtering membrane.

The present invention also comprises a method of dispensing a beverage using a beverage preparation machine comprising a brew head suitable for receiving a rigid or semi-rigid cartridge, the brew head comprising an upwardly directed inlet for supplying water to the brew head and a downwardly directed outlet for outflow of beverage produced by the machine, the method comprising the steps of:

opening a closure mechanism of the beverage preparation machine;

inserting an insert into the brew head, the insert being as claimed in any of claims 1 to 34 and containing a quantity of beverage ingredients;

closing the closure mechanism to squeeze the insert with sufficient force such that the sealing means of the insert seals together the upper and lower parts of the insert;

operating the beverage preparation machine to pass water upwardly from the inlet of the brew head through the inlet of the insert into the brew volume of the insert;

dispensing a beverage formed in the brew volume from the water and the beverage ingredients downwardly through the outlet of the insert and the outlet of the brew head.

The insert of the present invention may be loaded with one or more beverage ingredients suitable for the formation of a beverage product. The beverage product may be, for example, one of coffee, tea, chocolate or a dairy-based beverage including milk. The beverage ingredients may be powdered, ground, leaf-based or liquid. The beverage ingredients may be insoluble or soluble. Examples include roast and ground coffee, leaf tea, powdered chocolate and soup, liquid milk-based beverages, carbonated drinks and concentrated fruit juices.

In the following description the terms "upper" and "lower" and equivalents will be used to describe the relational positioning of features of the invention. The terms "upper" and "lower" and equivalents should be understood to refer to the insert (or other components) in its normal orientation for insertion into the beverage preparation machine and subsequent dispensing. In addition, the terms "inner" and "outer" and equivalents will be used to describe the relational positioning of features of the invention. The terms "inner" and "outer" and equivalents should be understood to refer to relative positions in the insert (or other components) being, respectively, nearer or further from a centre or major axis X of the insert (or other component).

Embodiments of the present invention will now be described, by way of example only, with reference to the accompanying drawings, in which:

FIG. 1a is a front perspective view of a beverage preparation machine of the present invention;

FIG. 2 is a rear perspective view of the machine of FIG. 1a with some parts omitted for clarity;

FIG. 3 is another rear perspective view of the machine of FIG. 1a with some parts omitted for clarity;

FIG. 8 is a schematic layout of the machine of FIG. 1a;

FIG. 9a and 9b are schematic layouts of first and second code recognition means for the machine of FIG. 1a; and FIG. 10 is a plan view of a beverage of the present invention comprising a barcode;

FIG. 17 is a cross-sectional drawing of an inner member of the cartridge;

FIG. 18 is a perspective view from above of the inner member of FIG. 17;

FIG. 19 is a perspective view from above of the inner member of FIG. 17 in an inverted orientation;

FIG. 20 is a plan view from above of the inner member of FIG. 17;

BEVERAGE PREPARATION SYSTEM

Figure 1B:
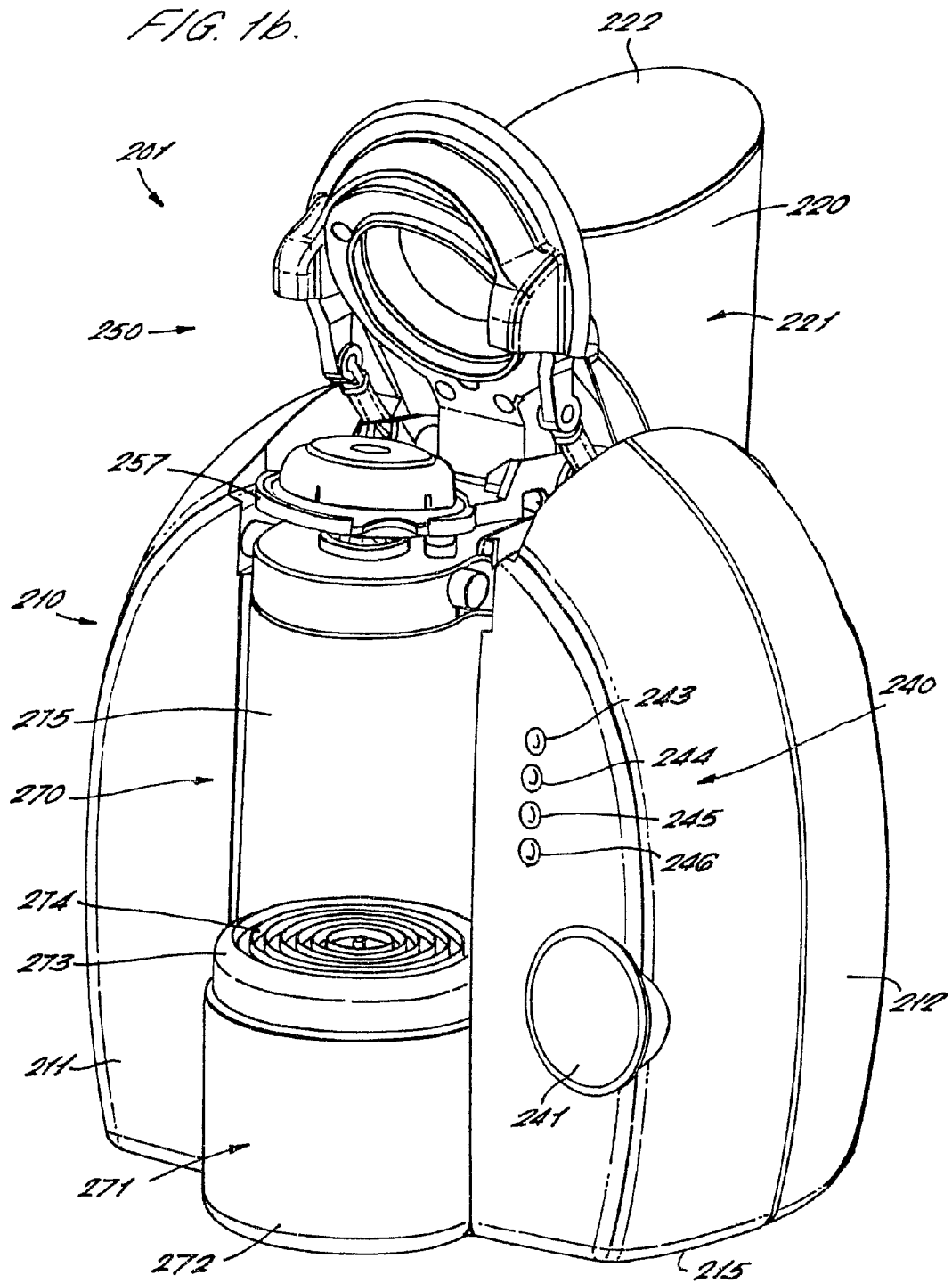
FIG. 1b is a front perspective view of the machine of FIG. 1a with a brew head in an open position.

A beverage preparation machine 201 of the beverage preparation system of the present invention is shown in FIGS. 1a to 9b. The beverage preparation machine 201 generally comprises a housing 210 containing a water tank 220, a water heater 225, a water pump 230, an air compressor 235, a control processor, a user interface 240 and a brew head 250. The brew head 250 in turn generally comprises a holder 251, recognition means 252 and inlet and outlet piercers 253, 254.

The beverage preparation machine 201 is designed to be capable of dispensing beverage ingredients from cartridges 1 such as that illustrated in FIGS. 10 to 21. In particular, the brew head 250 is designed to accommodate such cartridges 1 and correctly dispense beverage ingredients contained therein. According to one aspect of the present invention, an insert is provided to allow the brew head also to dispense beverage ingredients which are either loose or contained in other containers such as flexible bags. However, to aid understanding of the flexible operation of the beverage preparation machine and brew head an example of the cartridge 1 will first be described and its use in the beverage preparation machine 201 explained before the insert is itself described.

Cartridge for Use in the System

As shown in FIGS. 10 to 21, the cartridge 1 generally comprises an outer member 2, an inner member 3 and a laminate 5. The outer member 2, inner member 3 and laminate 5 are assembled to form the cartridge 1 which has an interior 120 for containing one or more beverage ingredients, an inlet 121, an outlet 122 and a beverage flow path linking the inlet 121 to the outlet 122 and which passes through the interior 120. The inlet 121 and outlet 122 are initially sealed by the laminate 5 and are opened in use by piercing or cutting of the laminate 5. The beverage flow path is defined by spatial inter-relationships between the outer member 2, inner member 3 and laminate 5 as discussed below. Other components may optionally be included in the cartridge 1, such as a filter 4, as will be described further below.

The cartridge 1 is particularly designed for use in dispensing filtered products such as roast and ground coffee or leaf tea. However, the cartridge 1 may be used with other products such as chocolate, coffee, tea, sweeteners, cordials, flavourings, alcoholic beverages, flavoured milk, fruit juices, squashes, sauces and desserts.

Figure 11:
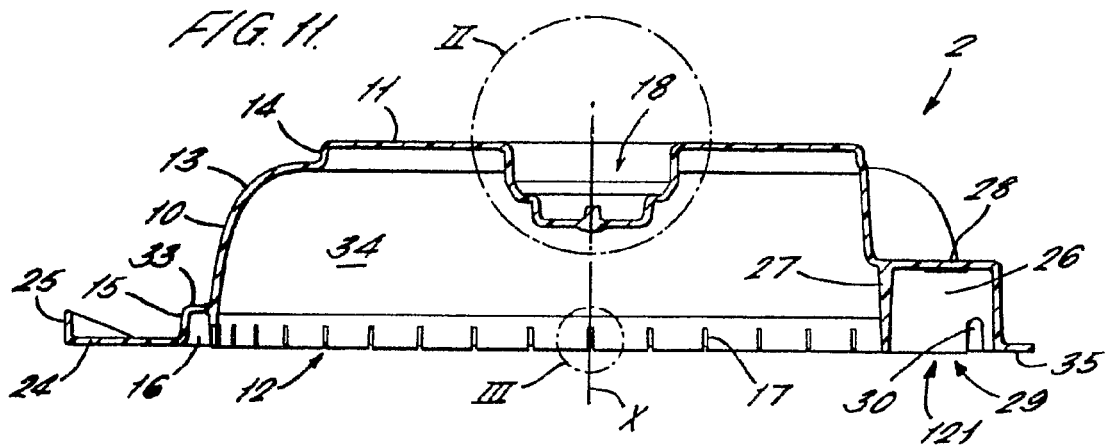
FIG. 11 is cross-sectional drawing of an outer member of a cartridge which may be used in the beverage preparation machine of the present invention.
Figure 12:
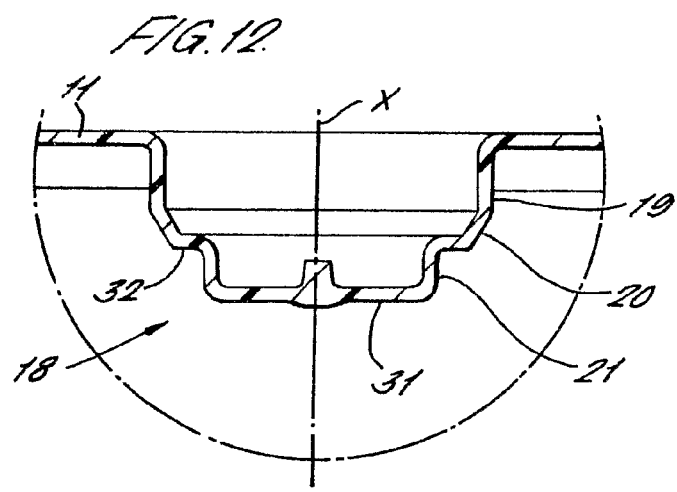
FIG. 12 is a cross-sectional drawing of a detail of the outer member of FIG. 11 showing an inwardly directed cylindrical extension.
Figure 15:
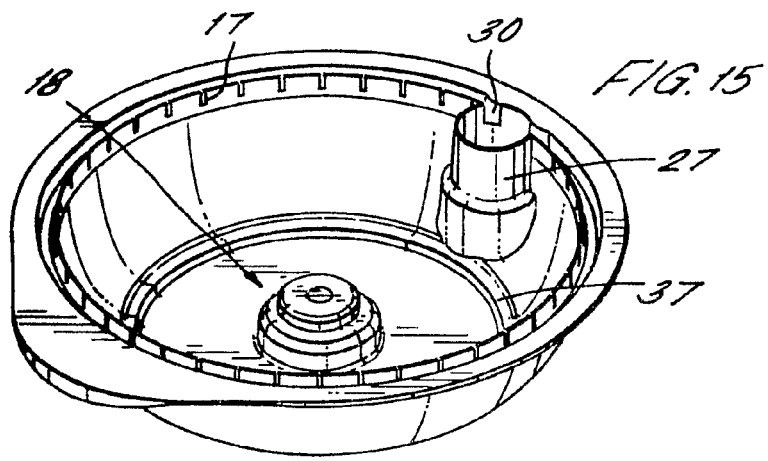
FIG. 15 is a perspective view from above of the outer member of FIG. 11 in an inverted orientation.
Figure 16:
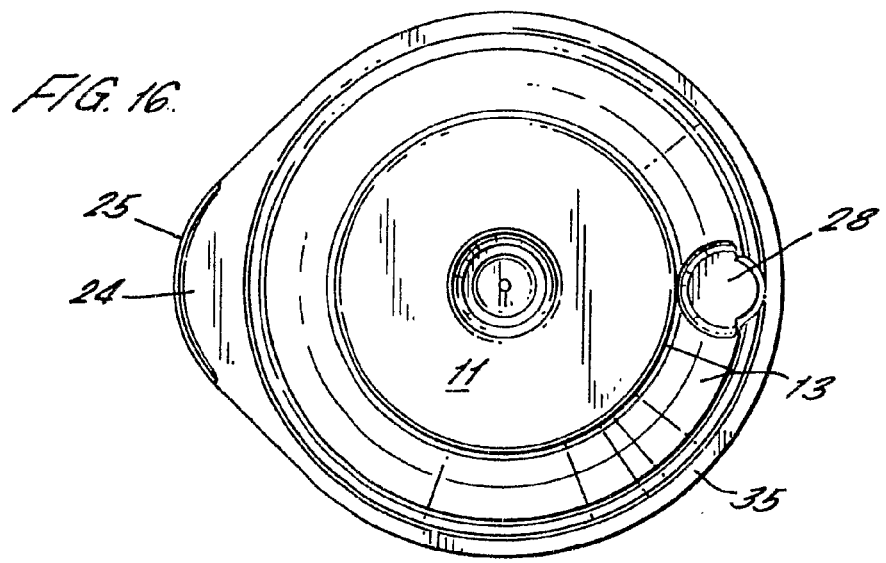
FIG. 16 is a plan view from above of the outer member of FIG. 11.

As can be seen from FIG. 15, the overall shape of the cartridge 1 is generally circular or disc-shaped with the diameter of the cartridge 1 being significantly greater than its height. A major axis X passes through the centre of the outer member as shown in FIG. 11. Typically the overall diameter of the outer member 2 is 74.5 mm±6 mm and the overall height is 16 mm±3 mm. Typically the volume of the cartridge 1 when assembled is 30.2 ml±20%.

The outer member 2 generally comprises a bowl-shaped shell 10 having a curved annular wall 13, a closed top 11 and an open bottom 12. The diameter of the outer member 2 is smaller at the top 11 compared to the diameter at the bottom 12, resulting from a flaring of the annular wall 13 as one traverses from the closed top 11 to the open bottom 12. The annular wall 13 and closed bottom 11 together define a receptacle having an interior 34.

A hollow inwardly directed cylindrical extension 18 is provided in the closed top 11 centred on the major axis X. As more clearly shown in FIG. 12, the cylindrical extension 18 comprises a stepped profile having first, second and third portions 19, 20 and 21. The first portion 19 is right circular cylindrical. The second portion 20 is frusto-conical in shape and is inwardly tapered. The third portion 21 is another right circular cylinder and is closed off by a lower face 31. The diameter of the first, second and third portion 19, 20 and 21 incrementally decreases such that the diameter of the cylindrical extension 18 decreases as one traverses from the top 11 to the closed lower face 31 of the cylindrical extension 18. A generally horizontal shoulder 32 is formed on the cylindrical extension 18 at the junction between the second and third portions 20 and 21.

Figure 13:
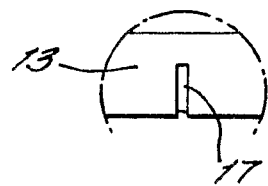
FIG. 13 is a cross-sectional drawing of a detail of the outer member of FIG. 11 showing a slot.
Figure 14:
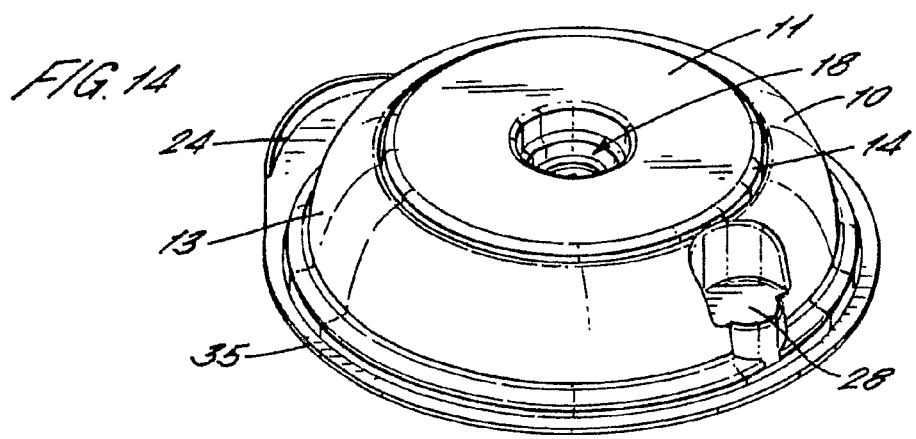
FIG. 14 is a perspective view from above of the outer member of FIG. 11.

An outwardly extending shoulder 33 is formed in the outer member 2 towards the bottom 12. The outwardly extending shoulder 33 forms a secondary wall 15 co-axial with the annular wall 13 so as to define an annular track forming a manifold 16 between the secondary wall 15 and the annular wall 13. The manifold 16 passes around the circumference of the outer member 2. A series of slots 17 are provided in the annular wall 13 level with the manifold 16 to pro-vide gas and liquid communication between the manifold 16 and the interior 34 of the outer member 2. As shown in FIG. 13, the slots 17 comprise vertical slits in the annular wall 13. Between 20 and 40 slots are provided. In the embodiment shown thirty-seven slots 17 are provided generally equi-spaced around the circumference of the manifold 16. The slots 17 are preferably between 1.4 and 1.8 mm in length. Typically the length of each slot is 1.6 mm representing 10% of the overall height of the outer member 2. The width of each slot is between 0.25 and 0.35 mm. Typically, the width of each slot is 0.3 mm. The width of the slots 17 is sufficiently narrow to prevent the beverage ingredients passing therethrough into the manifold 16 either during storage or in use.

An inlet chamber 26 is formed in the outer member 2 at the periphery of the outer member 2. A cylindrical wall 27 is provided, as most clearly shown in FIG. 15, which defines the inlet chamber 26 within, and partitions the inlet chamber 26 from, the interior 34 of the outer member 2. The cylindrical wall 27 has a closed upper face 28 which is formed on a plane perpendicular to the major axis X and an open lower end 29 co-planar with the bottom 12 of the outer member 2. The inlet chamber 26 communicates with the manifold 16 via two slots 30 as shown in FIG. 11. Alternatively, between one and four slots may be used to communicate between the manifold 16 and the inlet chamber 26.

A lower end of the outwardly extending shoulder 33 is provided with an outwardly extending flange 35 which extends perpendicularly to the major axis X. Typically the flange 35 has a width of between 2 and 4 mm. A portion of the flange 35 is enlarged to form a handle 24 by which the outer member 2 may be held. The handle 24 is provided with an upturned rim 25 to improve grip.

The outer member 2 is formed as a single integral piece from high density polyethylene, polypropylene, polystyrene, polyester, or a laminate of two or more of these materials. A suitable polypropylene is the range of polymers available from DSM UK Limited (Redditch, United Kingdom). The outer member may be opaque, transparent or translucent. The manufacturing process may be injection moulding.

The inner member 3 as shown in FIGS. 17 to 20, comprises an annular frame 41 and a downwardly extending cylindrical funnel 40. A major axis X passes through the centre of the inner member 3 as shown in FIG. 17.

As best shown in FIG. 18, the annular frame 41 comprises an outer rim 51 and an inner hub 52 joined by ten equi-spaced radial spokes 53. The inner hub 52 is integral with and extends from the cylindrical funnel 40. Filtration apertures 55 are formed in the annular frame 41 between the radial spokes 53. A filter 4 is disposed on the annular frame 41 so as to cover the filtration apertures 55. The filter is preferably made from a material with a high wet strength, for example a non-woven fibre material of polyester. Other materials which may be used include a water-impermeable cellulosic material, such as a cellulosic material comprising woven paper fibres. The woven paper fibres may be admixed with fibres of polypropylene, polyvinyl chloride and/or polyethylene. The incorporation of these plastic materials into the cellulosic material renders the cellulosic material heat-sealable. The filter 4 may also be treated or coated with a material which is activated by heat and/or pressure so that it can be sealed to the annular frame 41 in this way.

As shown in the cross-sectional profile of FIG. 17, the inner hub 52 is located at a lower position than the outer rim 51, resulting in the annular frame 41 having a sloping lower profile.

The upper surface of each spoke 53 is provided with an upstanding web 54 which divides a void space above the annular frame 41 into a plurality of passages 57. Each passage 57 is bounded on either side by a web 54 and on a lower face by the filter 4. The passages 57 extend from the outer rim 51 downwardly towards, and open into, the cylindrical funnel 40 at openings 56 defined by the inner extremities of the webs 54.

The cylindrical funnel 40 comprises an outer tube 42 surrounding an inner discharge spout 43. The outer tube 42 forms the exterior of the cylindrical funnel 40. The discharge spout 43 is joined to the outer tube 42 at an upper end of the discharge spout 43 by means of an annular flange 47. The discharge spout 43 comprises an inlet 45 at an upper end which communicates with the openings 56 of the passages 57 and an outlet 44 at a lower end through which the prepared beverage is discharged into a cup or other receptacle. The discharge spout 43 comprises a frusto-conical portion 48 at an upper end and a cylindrical portion 58 at a lower end. The cylindrical portion 58 may have a slight taper such that it narrows towards the outlet 44. The frusto-conical portion 48 helps to channel beverage from the passages 57 down towards the outlet 44 without inducing turbulence to the beverage. An upper surface of the frusto-conical portion 48 is provided with four support webs 49 equi-spaced around the circumference of the cylindrical funnel 40. The support webs 49 define channels 50 therebetween. The upper edges of the support webs 49 are level with one another and perpendicular to the major axis X.

The inner member 3 may be formed as a single integral piece from polypropylene or a similar material as described above and by injection moulding in the same manner as the outer member 2.

Alternatively, the inner member 3 and/or the outer member 2 may be made from a biodegradable polymer. Examples of suitable materials include degradable polyethylene (for example, SPITEK supplied by Symphony Environmental, Borehamwood, United Kingdom), biodegradable polyester amide (for example, BAK 1095 supplied by Symphony Environmental), poly lactic acids (PLA supplied by Cargil, Minnesota, USA), starch-based polymers, cellulose derivatives and polypeptides.

The laminate 5 is formed from two layers, a first layer of aluminium and a second layer of cast polypropylene. The aluminium layer is between 0.02 and 0.07 mm in thickness. The cast polypropylene layer is between 0.025 and 0.065 mm in thickness. In one embodiment the aluminium layer is 0.06 mm and the polypropylene layer is 0.025 mm thick. This laminate is particularly advantageous as it has a high resistance to curling during assembly. As a result the laminate 5 may be pre-cut to the correct size and shape and subsequently transferred to the assembly station on the production line without undergoing distortion. Consequently, the laminate 5 is particularly well suited to welding. Other laminate materials may be used including PET/Aluminium/PP, PE/EVOH/PP, PET/metallised/PP and Aluminium/PP laminates. Roll laminate stock may be used instead of die cut stock.

The cartridge 1 may be closed by a rigid or semi-rigid lid instead of a flexible laminate.

Assembly of the cartridge 1 involves the following steps:
a) the inner member 3 is inserted into the outer member 2;
b) the filter 4 is cut to shape and placed onto the inner member 3 so to be received over the cylindrical funnel 40 and come to rest against the annular frame 41;

c) the inner member 3, outer member 2 and filter 4 are joined by ultrasonic welding;
d) the cartridge 1 is filled with one or more beverage ingredients;
e) the laminate 5 is affixed to the outer member 2.

These steps will be discussed in greater detail below.

The outer member 2 is orientated with the open bottom 12 directed upwards. The inner member 3 is then inserted into the outer member 2 with the outer rim 51 being received as a loose fit in an axial extension 14 at top 11 of the cartridge 1. The cylindrical extension 18 of the outer member 2 is at the same time received in the upper portion of the cylindrical funnel 40 of the inner member 3. The third portion 21 of the cylindrical extension 18 is seated inside the cylindrical funnel 40 with the closed lower face 31 of the cylindrical extension 18 bearing against the support webs 49 of the inner member 3. The filter 4 is then placed over the inner member 3 such that the filter material contacts the annular rim 51. An ultrasonic welding process is then used to join the filter 4 to the inner member 3 and at the same time, and in the same process step, the inner member 3 to the outer member 2. The inner member 3 and filter 4 are welded around the outer rim 51. The inner member 3 and outer member 2 are joined by means of weld lines around the outer rim 51 and also the upper edges of the webs 54.

Figure 21:
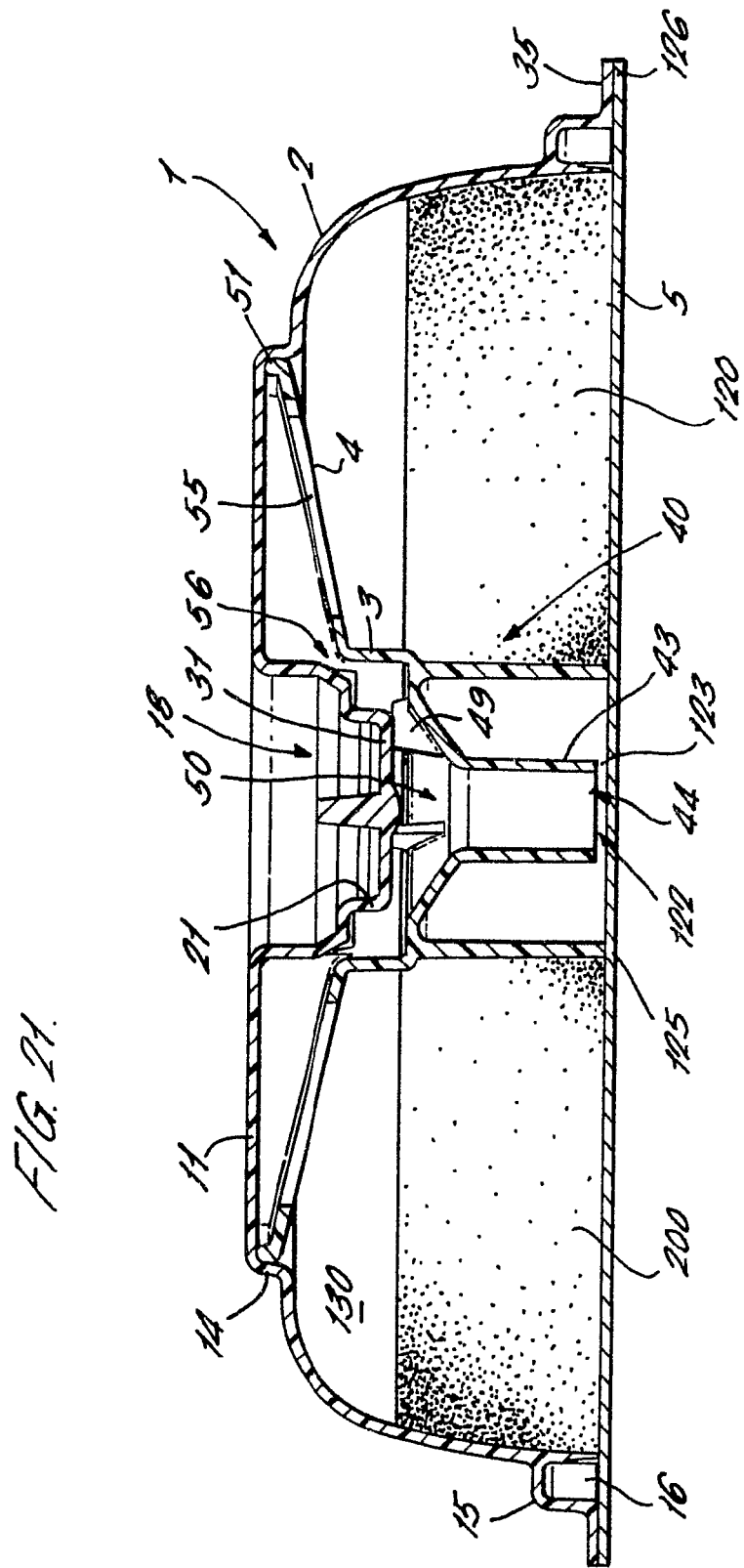
FIG. 21 is a cross-sectional drawing of the cartridge in an assembled condition.

As shown most clearly in FIG. 21, the outer member 2 and inner member 3 when joined together define a void space 130 in the interior 120 below the annular flange 41 and exterior the cylindrical funnel 40 which forms a filtration chamber. The filtration chamber 130 and passages 57 above the annular frame 41 are separated by the filter paper 4.

The filtration chamber 130 contains the one or more beverage ingredients 200. The one or more beverage ingredients are packed into the filtration chamber 130. For a filtered style beverage the ingredient is typically roast and ground coffee or leaf tea. The density of packing of the beverage ingredients in the filtration chamber 130 can be varied as desired. Typically, for a filtered coffee product the filtration chamber contains between 5.0 and 10.2 grams of roast and ground coffee in a filtration bed of thickness of typically 5 to 14 mm. Optionally, the interior 120 may contain one or more bodies, such as spheres, which are freely movable within the interior 120 to aid mixing by inducing turbulence and breaking down deposits of beverage ingredients during discharge of the beverage.

The laminate 5 is then affixed to the outer member 2 by forming a weld 126 around the periphery of the laminate 5 to join the laminate 5 to the lower surface of the outwardly extending flange 35. The weld 126 is extended to seal the laminate 5 against the lower edge of the cylindrical wall 27 of the inlet chamber 26. Further, a weld 125 is formed between the laminate 5 and the lower edge of the outer tube 42 of the cylindrical funnel 40. The laminate 5 forms the lower wall of the filtration chamber 130 and also seals the inlet chamber 26 and cylindrical funnel 40. However, a small gap 123 exists prior to dispensation between the laminate 5 and the lower edge of the discharge spout 43. A variety of welding methods may be used, such as heat and ultrasonic welding, depending on the material characteristics of the laminate 5.

Advantageously, the inner member 3 spans between the outer member 2 and the laminate 5. The inner member 3 is formed from a material of relative rigidity, such as polypropylene. As such, the inner member 3 forms a load-bearing member that acts to keep the laminate 5 and outer member 2 spaced apart when the cartridge 1 is compressed. It is preferred that the cartridge 1 is subjected to a compressive load of between 130 and 280N in use. The compressive force acts to prevent the cartridge failing under internal pressurisation and also serves to squeeze the inner member 3 and outer member 2 together. This ensures that the internal dimensions of passageways and apertures in the cartridge 1 are fixed and unable to change during pressurisation of the cartridge 1.

To use the cartridge 1 it is first inserted into the beverage preparation machine and the inlet 121 and outlet 122 are opened by piercing members of the beverage preparation machine which perforate and fold back the laminate 5. An aqueous medium, typically water, under pressure enters the cartridge 1 through the inlet 121 into the inlet chamber 26 at a pressure of between 0.1-2.0 bar. From there the water is directed to flow through the slots 30 and round the manifold 16 and into the filtration chamber 130 of the cartridge 1 through the plurality of slots 17. The water is forced radially inwardly through the filtration chamber 130 and mixes with the beverage ingredients 200 contained therein. The water is at the same time forced upwardly through the beverage ingredients. The beverage formed by passage of the water through the beverage ingredients passes through the filter 4 and filtration apertures 55 into the passages 57 lying above the annular frame 41. The sealing of the filter 4 onto the spokes 53 and the welding of the rim 51 with the outer member 2 ensures that there are no short-circuits and all the beverage has to pass through the filter 4.

The beverage then flows downwardly along the radial passages 57 formed between the webs 54 and through the openings 56 and into the cylindrical funnel 40. The beverage passes along the channels 50 between the support webs 47 and down the discharge spout 43 to the outlet 44 where the beverage is discharged into a receptacle such as a cup.

Preferably, the beverage preparation machine comprises an air purge facility, wherein compressed air is forced through the cartridge 1 at the end of the dispense cycle to flush out the remaining beverage into the receptacle.

The cartridge 1 described above is given as an example of the type of cartridge that the brew head of the beverage preparation machine is capable of dispensing. Other cartridges of a similar type may be provided for dispensing other beverage types, for example foamed milk, espresso-style coffee, chocolate.

Beverage Preparation Machine

As shown in FIG. 1a the housing 210 contains and holds in position the other components of the machine 201. The housing 210 preferably made in whole or in part from a robust plastics material such as ABS. Alternatively, the housing 210 can be made in whole or in part from a metallic material such as stainless steel or aluminium. The housing 210 preferably comprises a clam-shell design having a front half 211 and a rear half 212 which allow access during assembly for fitting of the machine 201 components and can afterwards be joined together to define an interior 213 of the housing 210. The rear half 212 provides a recess 214 for the attachment of the water tank 220. The housing 210 is formed with means, such as detents, abutments, bosses and threaded portions, for retaining the components of the machine 201 in position without the need for a separate chassis. This reduces the overall cost and weight of the machine 201. A base 215 of the housing 210 is preferably provided with feet for standing the machine thereon in a stable manner. Alternatively, the base 215 itself may have a shape forming a stable support.

The front half 211 of the housing 210 comprises a dispense station 270 where dispensation of the beverage takes place. The dispense station 270 comprises a receptacle stand 271 having a hollow interior forming a drip tray 272. An upper surface 273 of the receptacle stand is provided with a grill 274 on which the receptacle is positioned. The drip tray 272 is removable from the housing 210 to ease emptying of the collected water. A recess 275 is formed in the front half of the housing 210 above the receptacle stand 271 to accommodate the dimensions of the receptacle.

The brew head 250 is located towards the top of the housing 210 above the receptacle stand as shown in FIGS. 1a and 1b. Preferably, the height of the grill 274 relative to the brew head 250 can be adjusted to accommodate different sizes of receptacle. It is preferred that the receptacle is as close to the brew head 250 as possible, whilst still allowing the receptacle to be inserted and withdrawn from the dispense station 270, so as to minimise the height that the dispensed beverage has to descend before contacting the receptacle. This acts to minimise spraying and splashing of the beverage and minimise loss of entrained air bubbles where these are present. Preferably receptacles of between 70 mm and 110 mm in height can be inserted between the grill 274 and brew head 250.

The machine user interface 240 is located on the front of the housing 210 and comprises a start/stop button 241, and a plurality of status indicators 243-246.

The status indicators 243-246 preferably include a light emitting diode (LED) 243 to indicate readiness of the machine 201, a LED 244 to indicate if an error has occurred in the machine 201 operation, and one or more LEDs 245-256 to indicate whether the machine 201 is operating in manual or automatic modes. The LEDs 243-246 may be controlled to illuminate at a constant intensity, to flash intermittently, or both depending on the status of the machine 201. The LEDs 243-246 may have a variety of colours including green, red and yellow.

The start/stop button 241 controls commencement of the dispense cycle and is a manually operated push-button, switch or similar.

A volume adjustment control may be provided to allow a user of the machine 201 to manually adjust the volume of the delivered beverage without altering the other operating characteristics. Preferably the volume adjustment control allows an adjustment in volume of plus or minus 20%. The volume adjustment control may be a rotary knob, a linear slider, a digital readout with increment and decrement buttons, or similar. More typically, volume is controlled by a user operating the start/stop button 241.

A manual power switch (not shown) may be provided on the machine 201. Alternatively, power supply can be controlled simply by insertion or removal or the power supply plug from the mains power supply.

The water tank 220 is located to the rear of the housing 210 and is connected to the rear half 212 of the housing 210. The water tank 220 comprises a generally cylindrical body 221 which may be right circular or a frustum as desired for aesthetic reasons. The tank comprises an inlet for filling the tank with water which is closed off in use by a manually removable lid 222. An outlet is provided towards a lower end of the tank which communicates with the water pump 230. The water tank 220 may be made from a transparent or translucent material to allow a consumer to view the quantity of water remaining in the tank. Alternatively, the water tank 220 may be made from an opaque material but have provided a viewing window therein. In addition, or in place of the above, the water tank 220 may be provided with a low level sensor which prevents operation of the water pump 230 and optionally triggers a warning indicator, such as an LED, when the water level in the tank descends to a preselected level. The water tank 220 preferably has an internal capacity of approximately 1.5 liters.

Figure 8:
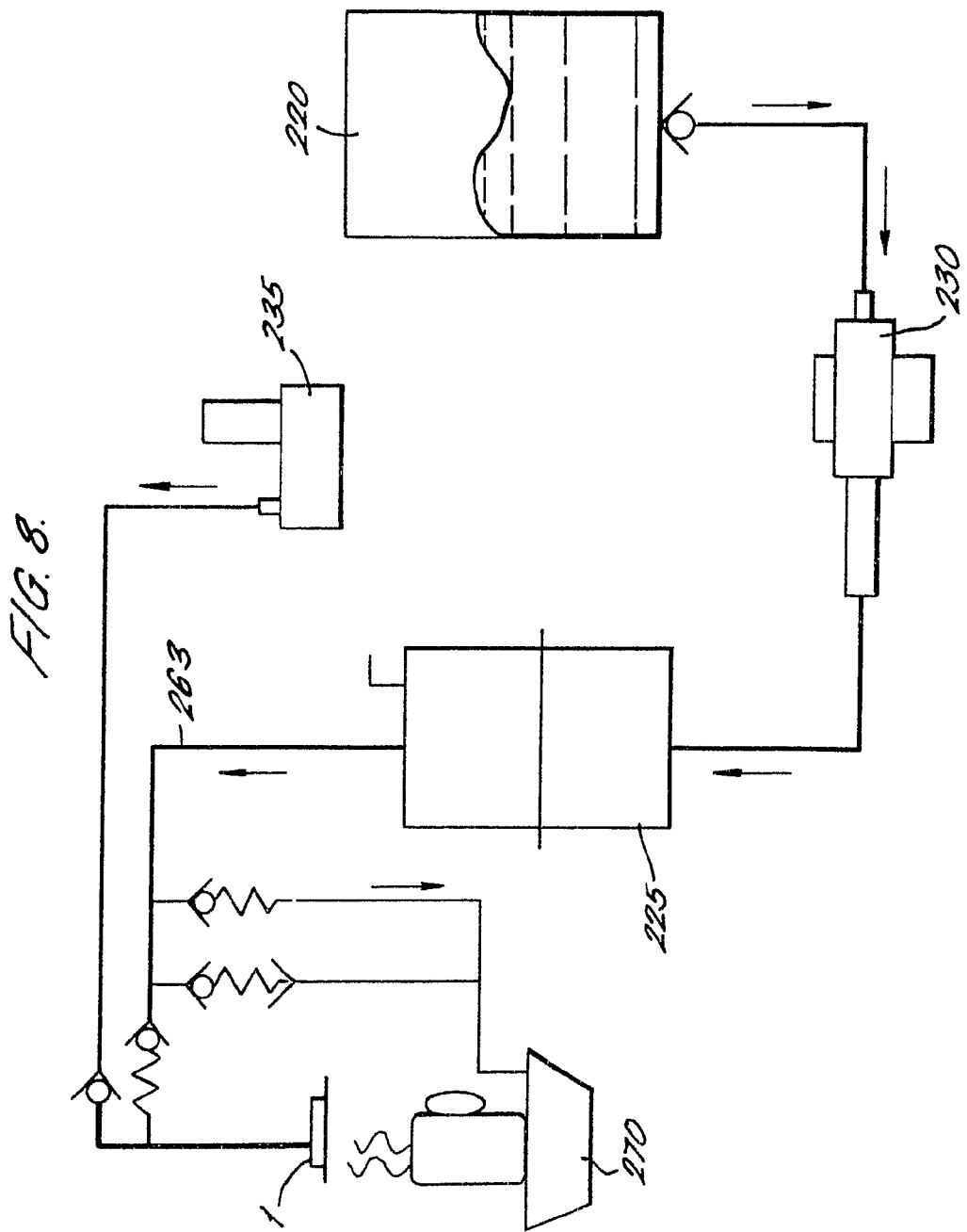

The water pump 230 is operatively connected between the water tank 220 and the water heater 225 as shown schematically in FIG. 8 and is controlled by the control processor. The pump provides a maximum flow rate of 900 ml/min of water at a maximum pressure of 2.5 bar. Preferably, in normal use, the pressure will be limited to 2 bar. The flow rate of water through the machine 201 can be controlled by the control processor to be a percentage of the maximum flow rate of the pump by cycle chopping the electrical supply to the pump. Preferably the pump can be driven at any of 10%, 20%, 30%, 40%, 50%, 60%, 70%, 80%, 90% or 100% of the maximum rated flow rate. The accuracy of the volume of water pumped is preferably + or −5% leading to a + or −5% accuracy in the final volume of the dispensed beverage. A suitable pump is the Evolution® EP8 pump produced by Ulka S.r.l. (Pavia, Italy). A volumetric flow sensor (not shown) is preferably provided in the flow line either upstream or downstream of the water pump 230. Preferably, the volumetric flow sensor is a rotary sensor.

The water heater 225 is located in the interior of the housing 210. The heater 225 has a power rating of 1550 W and is able to heat water received from the water pump 230 from a starting temperature of approximately 20° C. to an operating temperature of around 85° C. in under 1 minute. Preferably the dwell time between the end of one dispense cycle and the heater 225 being able to commence a subsequent dispense cycle is less than 10 seconds The heater maintains the selected temperature to within + or −2° C. during the dispense cycle. The water for the dispense cycle may be delivered to the brew head 250 at 83° C. or 93° C. The heater 225 is able to quickly adjust the delivery temperature to either 83° C. or 93° C. from a nominal water temperature of 85° C. The heater 225 comprises an over-temperature cut-off which shuts off the heater if the temperature exceeds 98° C. Water output from the heater 225 is fed to the brew head 250 by means of a three-way valve. If the pressure of the water flow is acceptable the water is passed to the cartridge 1. If the pressure is below or above predetermined limits then the water is diverted by means of the three-way valve into the drip tray recovery receptacle 270.

The air compressor 235 is operatively connected to the brew head 250 by means of a one-way valve and controlled by the control processor. The air compressor 235 provides a maximum flow rate of air of 500 ml/min at 1.0 bar. In use a working volume of 35 ml is pressurised to 2.0 bar. Preferably, the air compressor 235 can produce two flow rates: a fast (or maximum) flow rate and a slow flow rate.

The control processor of the beverage preparation machine 201 comprises a processing module and a memory. The control processor is operatively connected to, and controls operation of, the water heater 225, water pump 230, air compressor 235 and user interface 240.

The memory of the control processor includes one or more variables for one or more operational parameters for the beverage preparation machine 201. The operational parameters are the temperature of the water passed through the beverage cartridge 1 during the operating stage, the speed of charging the beverage cartridge 1, the presence or otherwise of a soak step, the total dispensed volume of the beverage, the flow rate of the water during the discharge stage, and the flow rate and period of the purge stage.

The variables for the operational parameters are stored in the memory. The cartridge 1 comprises a code provided on or in the cartridge 1 representing the operational parameters required for optimal dispensation of the beverage in that cartridge 1. The code is in binary format and comprises a plurality of data bits corresponding to the variables stored in the control processor memory.

The brew head 250 is shown in FIGS. 4 to 7. The holder 251 of the brew head 250 comprises a fixed lower part 255, a rotatable upper part 256 and a pivotable cartridge mount 257 positioned inbetween the fixed lower part 255 and the rotatable upper part 256. The upper part 256, lower part 255 and cartridge mount 257 are rotated about a common hinge axis 258. FIGS. 4 to 7 show the holder 251 with some components of the machine 201 omitted for clarity.

The rotatable upper part 256 and pivotable cartridge mount 257 are moved relative to the fixed lower part 255 by means of a clamping mechanism 280. The clamping mechanism 280 comprises a clamping lever having first and second members or parts 281 and 282. The first part 281 of the clamping lever comprises a U-shaped arm which is pivotably mounted to the upper part 256 at two first pivot points 283, one on each side of the holder 251.

The second part of the clamping lever comprises two over-centre arms 282, one on each side of the holder 251 which are each pivotably mounted to the upper part 256 at a second pivot point 285 located on the hinge axis 258 coupling the upper part 256 to the fixed lower part 255. Each over-centre arm 282 is a reciprocal member comprising a cylinder 282a, a stem 282b and a resilient sleeve 282c. The cylinder 282a has an internal bore and is rotatably mounted at one end at the hinge axis 258. A first end of the stem 282b is slidingly received in the bore of the cylinder 282a. The opposite end of the stem 282b is rotatably mounted to the U-shaped arm 281 at a third pivot point 286. The third pivot points 286 are unconnected to, and freely moveable relative to, the upper part 256 and lower part 255. The resilient sleeve 282c is mounted externally on the stem 282b and extends, in use, between abutment surfaces on the cylinder 282a and stem 282b. The resilient sleeve 282c accommodates shortening of the over-centre arm 282 but biases the over-centre arm 282 into an extended configuration. Movement of the third pivot points 286 towards and away from the hinge axis 258 is thus possible by relative movement of the stems 282b in the cylinders 282a. The resilient sleeves 282c are preferably formed from silicone. Whilst the illustrated embodiment uses two over-centre arms 282, it will be apparent that the closure mechanism my be configured with only one over-centre arm 282.

The U-shaped arm 281 extends around the front of the holder 251 and comprises two downwardly dependant hook members 287, one on each side of the holder 251, each comprising a cam surface 288 facing the hinge axis 258. The fixed lower part 255 of the holder 251 is provided with two bosses 259, or detents, located one on each side of the lower part 255 at or near a front edge 260 thereof aligned generally with the hook members 287.

Figure 4:
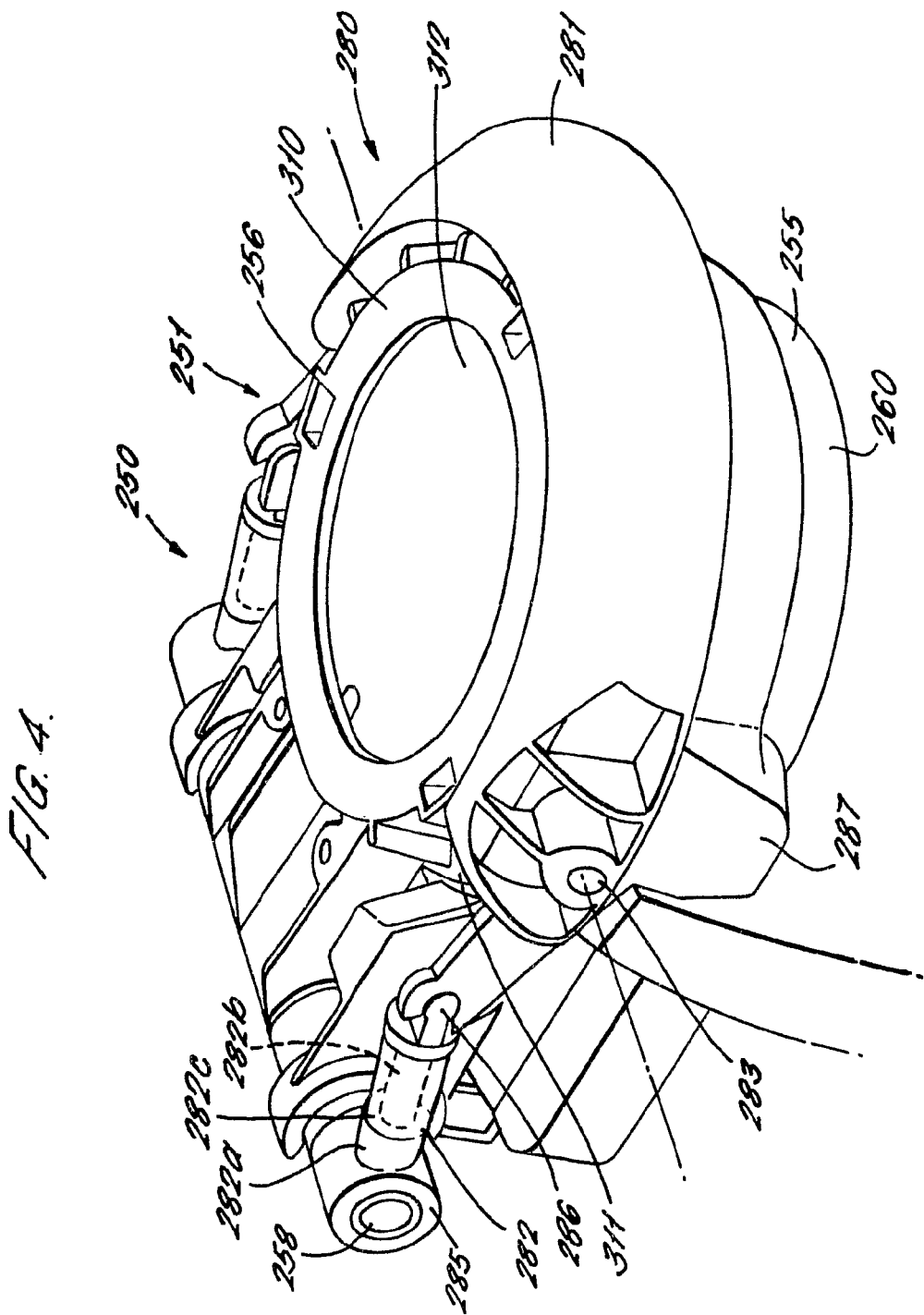
FIG. 4 is a perspective view of the brew head of the machine of FIG. 1a with some parts omitted for clarity.
Figure 5:
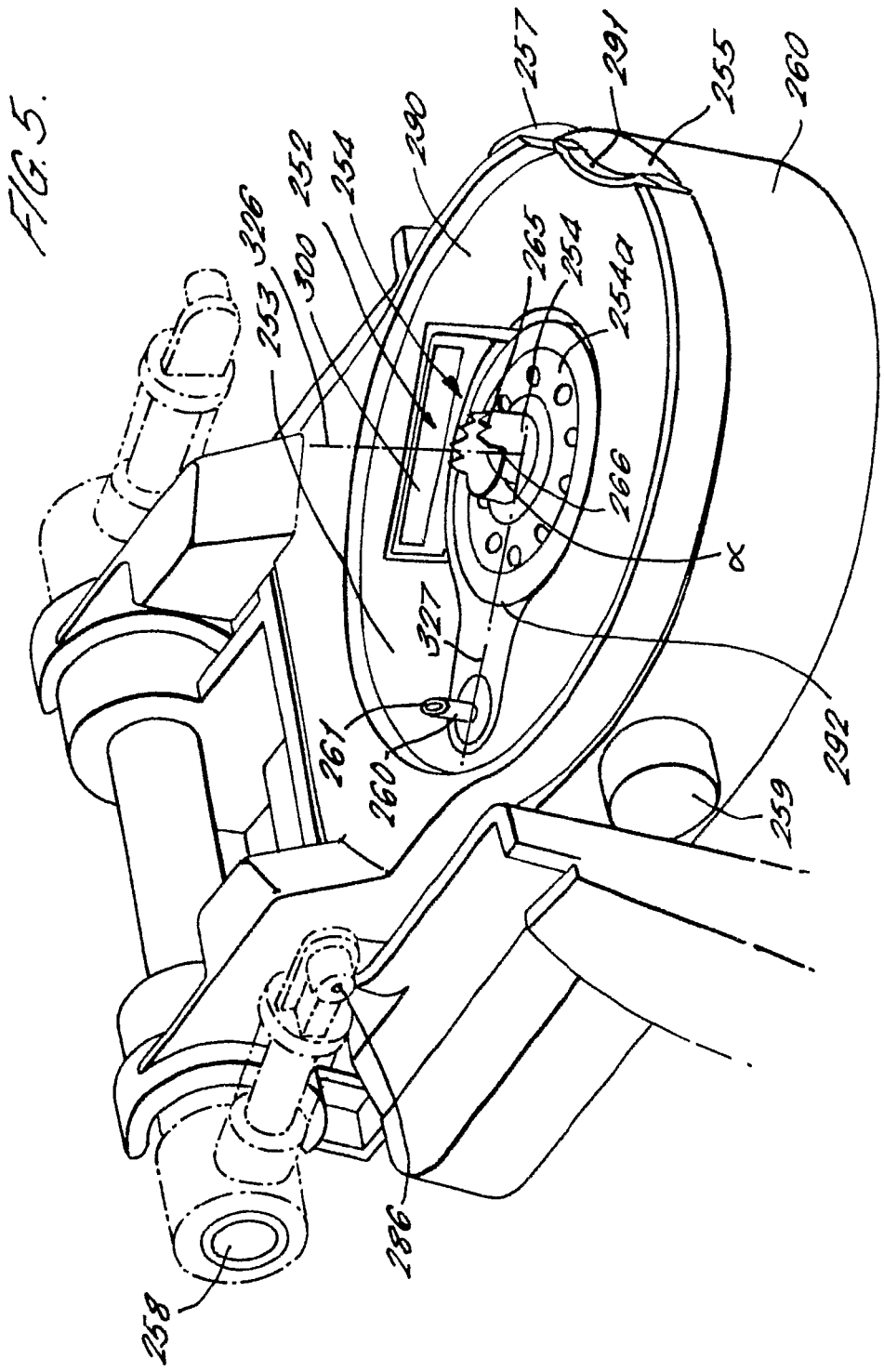
FIG. 5 is another perspective view of the brew head of the machine of FIG. 1a with some parts omitted for clarity.
Figure 6:
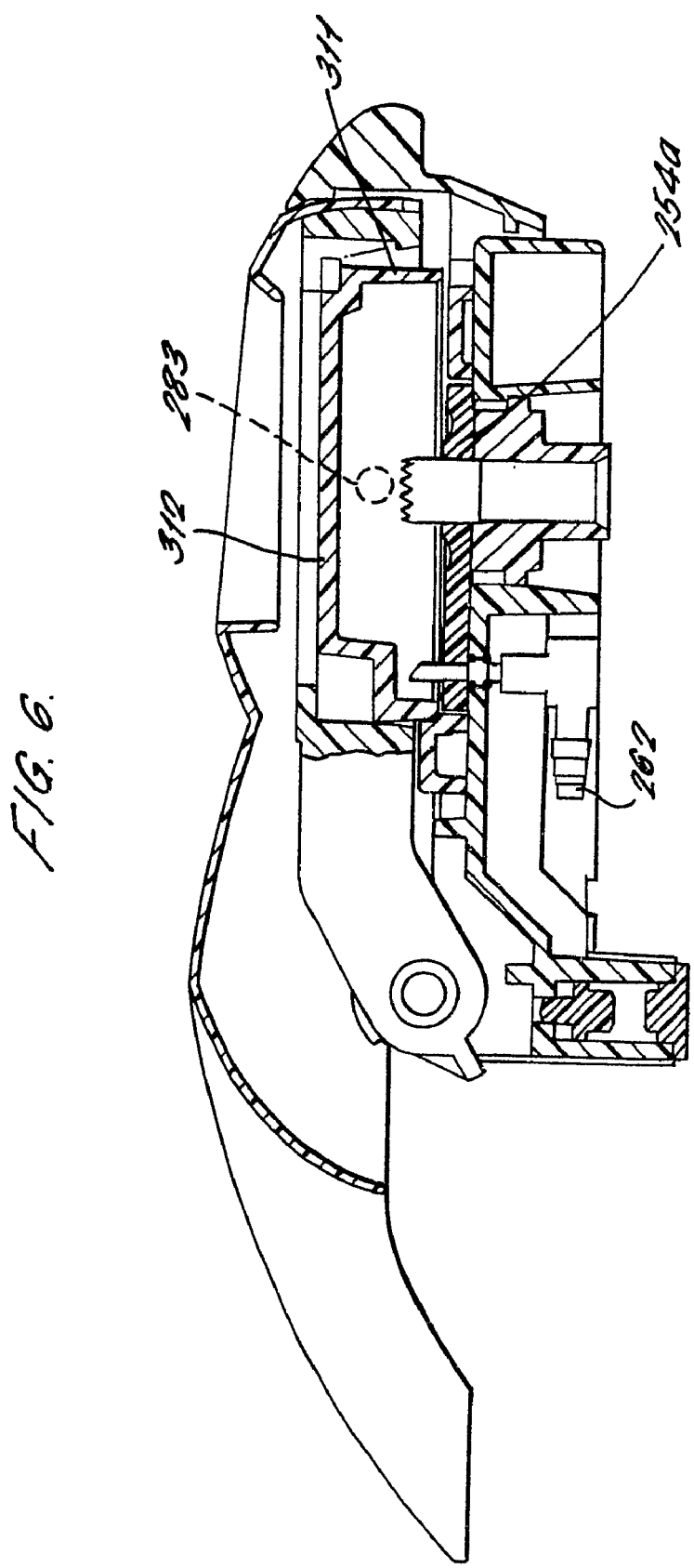
FIG. 6 is a cross-sectional view of the brew head in a closed position.

As shown in FIG. 4, the U-shaped arm 281 may be formed from a one piece plastics moulding comprising an ergonomic hand grip and the hook members 287 integral to the arm.

Figure 7:
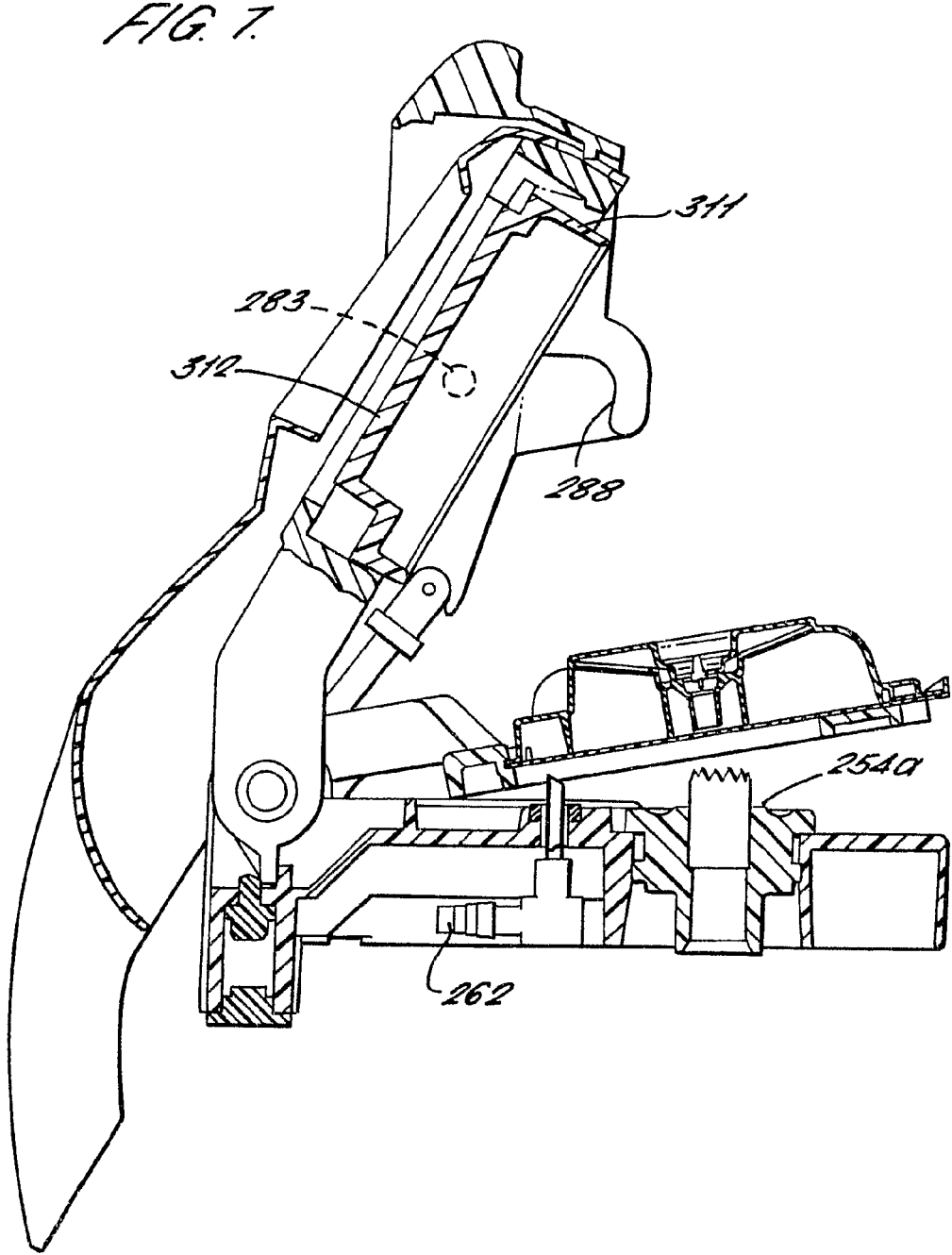
FIG. 7 is a cross-sectional view of the brew head in an open position illustrated containing a cartridge.

The cartridge mount 257 is rotatably mounted between the upper and lower parts 255, 256 of the holder 251. The mount 257 is provided with a substantially circular recess 290 which receives in use the beverage cartridge 1. The recess 290 includes an irregularity 291 for accommodating the handle portion 24 of the beverage cartridge 1 which also acts to prevent rotation of the beverage cartridge 1 in the holder 251. The cartridge mount 257 is sprung relative to the fixed lower part 255 such that in the open position, as shown in FIG. 7, the cartridge mount 257 is biased out of contact with the fixed lower part 255 so that the cartridge mount 257 is moved out of contact with the outlet and inlet piercer members 254, 253. The cartridge mount 257 is provided with an aperture 292 for receiving therethrough the inlet and outlet piercers 253, 254 and a head 300 of the cartridge recognition means 252 when the cartridge mount 257 is moved into the closed position.

The upper part 255 comprises a generally circular body 310 housing a circular viewing window 312 through which a consumer can view the beverage cartridge 1 during a dispense cycle and also visually confirm whether a cartridge 1 is loaded in the machine 201. The viewing window 312 is cup-shaped having a downwardly directed rim 311. The viewing window 312 is able to move axially relative to the body 310 of the upper part 255. One arrangement of accomplishing the relative movement is to provide a wave spring (not shown), or similar resilient means such as a rubberised ring, positioned between the viewing window 312 and the circular body 310. In an alternative arrangement, a series of helical compression springs (not shown) are provided extending between the viewing window 312 and the body 310. In both cases the resilient means allows the viewing window 312 to move axially relative to the circular body 310 by a small degree.

When the holder 251 is in the closed position, the viewing window 312 bears against the beverage cartridge 1 biasing it against the lower part 256. In one arrangement, the rim 311 of the viewing window contacts and bears against the flange 35 of the beverage cartridge. At the same time the window 312 contacts the closed top 11 of the cartridge 1. In an alternative arrangement, only the viewing window 312 contacts the closed top 11 of the cartridge 1, and there is no bearing contact between the rim 311 and the flange 35. The pressure exerted by the rim 311 on the flange 35 and/or by the window 312 on the closed top 11 ensures a fluid tight seal between the cartridge 1 and the holder 251.

The lower part 255 comprises the inlet and outlet piercers 253, 254 and the head 300 of the cartridge recognition means 252. The inlet piercer 253 comprises a hollow needle-like tube 260 having a sharpened end 261 for perforating the laminate 5 of the beverage cartridge 1, in use. The inlet piercer 253 is in fluid communication with a water conduit 262 as shown in FIG. 7 which passes through the lower part 255 and is connected to an outlet conduit 263 of the water heater 225. The outlet piercer 254 is similar in type to the outlet piercer described in the applicant's European patents EP 0 389 141 and EP 0 334 572 and comprises an open ended cylinder 264 of circular or D-shaped cross-section having dimensions larger than the discharge spout 43. An arcuate portion 265 of the upper end of the outlet piercer 254 is serrated to pierce and eventually cut the laminate of the beverage cartridge 1. The remainder of the upper end is cut back longitudinally of the cylinder at least to the base of the teeth 266 of the serrated portion to fold or pull the cut laminate 5 away from the outlet aperture before the beverage is dispensed therethrough. The outlet piercer 254 pierces the laminate 5 externally of the discharge spout 43 and when the cartridge mount 257 is in the closed position, rests in the annulus between the discharge spout 43 and the outer wall 42 of the discharge funnel 40. The outlet piercer 254 folds back the cut laminate 105 into the annulus. Thereby both the outlet piercer 254 and the cut laminate 105 are held out of the way of the discharged beverage.

The outlet piercer 254 is surrounded by a ledge 254a which is raised relative to its surroundings by 0.5 mm.

Advantageously, the outlet piercer 254 is removable from the lower part 255 to enable it to be thoroughly cleaned, for example, in a dishwasher. The removable outlet piercer 254 is received in a recess 267 in the lower part 255 where it is seated. The inlet piercer 253 and/or the outlet piercer 254 may be made of a metal, such as stainless steel, or from a plastics material. Advantageously, the use of plastic cutting elements is enabled by use of a laminate 5 which is able to be punctured and cut by a non-metallic material. Consequently, the piercers 253, 254 can be made less sharp which lowers the risk of injury to the consumer. In addition, plastic piercing elements are not prone to rust. Preferably, the inlet piercer 253 and the outlet piercer 24 are formed as a single, integral unit which is removable from the lower part 255.

In use, the upper part 256 of the holder 251 is movable from an open position in which it is orientated vertically or towards the vertical as shown in FIG. 1b, to a closed position in which it is orientated substantially horizontally and in interengagement with the fixed lower part 255 and cartridge mount 257. The upper part 256 is moved from the open to the closed positions by operation of the clamping lever. To close the upper part 256 a user takes hold of the clamping lever by the U-shaped arm 281 and pulls downwards. Consequently, the upper part 256 rotates which first brings the rim 311 of the viewing window 312 into contact with the flange 35 of the beverage cartridge 1 in the cartridge mount 257 and/or the window 312 itself into contact with the closed top 11 of the cartridge 1. Continued rotation of the upper part 256 rotates the upper part 256 and cartridge mount 257 down into contact with the lower part 255. Further rotation of the U-shaped arm 281 causes the U-shaped arm 281 to rotate relative to the upper part 256 and the lower part 255 resulting in the hook members 287 of the upper part 256 engaging the bosses 259 of the lower part 255 with the cam surface 288 riding over the bosses 259. During this last stage of rotation the cartridge 1 is compressed between the cartridge mount 257 and the viewing window 312. As a result, the viewing window 312 is moved axially relative to the circular body 310 of the upper part 256 against the bias of the wave spring or helical springs. This movement allows for a take up of tolerances in the beverage cartridge 1 and beverage preparation machine and ensures that the amount of compressive force applied to the cartridge is kept within an acceptable range. The clamping force of the mechanism as moderated by the action of the wave spring or helical springs ensures a clamping pressure on the cartridge. For the arrangement where bearing pressure is applied to both the flange 35 and the closed top 11 of the cartridge 1, it has been found that a pressure of between 130 and 280N is required. Preferably the force is approximately 200N. A force less than about 130N does not provide an adequate seal, whilst a force greater than about 280N leads to plastic failure of the components of the cartridge 1. For the arrangement where bearing pressure is applied only to the closed top 11 of the cartridge 1 it has been found that a pressure of between 50N and 280N is required. It will be noted that a lower pressure level is possible with this arrangement without a deleterious effect on the sealing of the cartridge 1. During closure of the brew head the laminate 5 of the cartridge 1 is tensioned as it is brought into contact with the ledge 254a surrounding the outlet piercer 254 which causes the laminate 5 to flex out of plane as the distal end of the outer tube 42 of the cylindrical funnel is moved upwardly by 0.5 mm relative to the flange 35. This movement also ensures that the great majority of the compressive force applied to the cartridge acts through the central region of the cartridge 1 through the load-bearing inner member 3. In the closed position the cartridge 1 may thus be clamped around the flange 35 by means of the rim 311 of the viewing window 312 and is always firmly clamped between the closed top 11 of the cartridge and the outer tube 42 of the inner member 3 by contact with the viewing window 312 and the ledge 254a. These clamping forces help prevent failure of the cartridge 1 during pressurisation and also ensure that the inner member 3 and outer member 2 are fully seated relative to one another and thus that all internal passageways and apertures remain at their intended dimensions even during internal pressurisation.

An imaginary datum line can be drawn between the first and second pivot points 283, 285 of the holder 251. As can be seen in FIG. 7, in the open position the third pivot points 286 are located on the side of the datum line nearest the fixed lower part 255. As the upper part 256 reaches the closed position, the third pivot points 286 of the clamping lever pass through the datum line joining the first and second pivot points 283, 285 to the opposite side of the line, furthest from the fixed lower part 255. Consequently, the U-shaped arm 281 'snaps through' from a first stable position to a second stable position. The snap through action is accommodated by shortening of the over-centre arms 282 and consequential compression of the resilient sleeves 282c. Once the third pivot points 286 are past the imaginary datum line then recovery of the resilient sleeves 282c acts to continue the motion of the third pivot points 286 away from the imaginary datum line. The clamping lever thus has a bi-stable operation in that the lever is stable in the open or closed positions but unstable at the point when the third pivot points 286 lie on the imaginary datum line joining the first and second pivot points 283, 285. Thus, the snap-through action of the clamping lever provides a positive closure mechanism which leads to a definite closure action wherein in the final stages of the clamping lever's rotation, the snap-through action of the U-shaped arm 281 and second arms 284 forces the hook members 287 firmly into engagement with the bosses 259. In addition, the resilient sleeves 282c provide a resistance to re-opening of the upper part 256 since a minimum force is required to compress the sleeves 282c sufficiently to move the third pivot points 286 back into line with the datum line joining the first and second pivot points 283, 285. Advantageously, the interengagement of the hook members 287 and the bosses 259 prevents separation of the upper and lower parts other than by rotation of the clamping lever. This is useful in preventing opening of the brew head 250 during operation when the brew head 250 is subject to internal pressurisation.

Figure 9A:
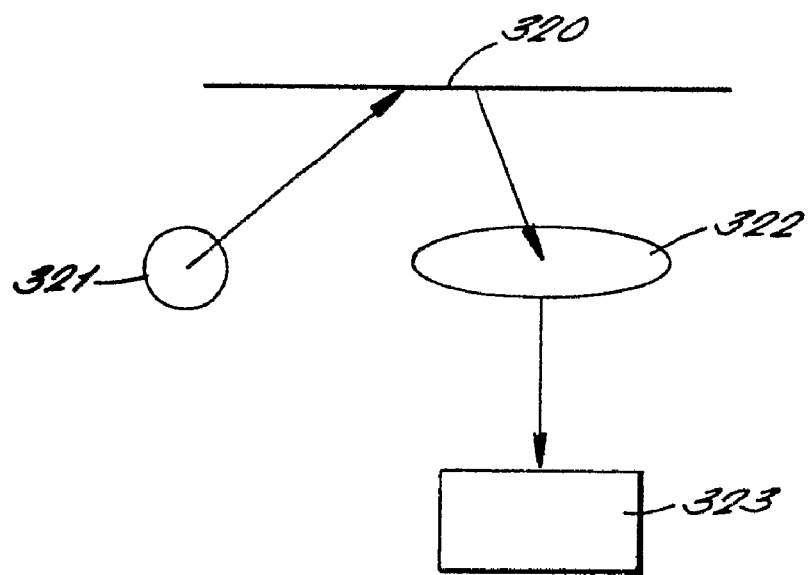
Figure 9B:
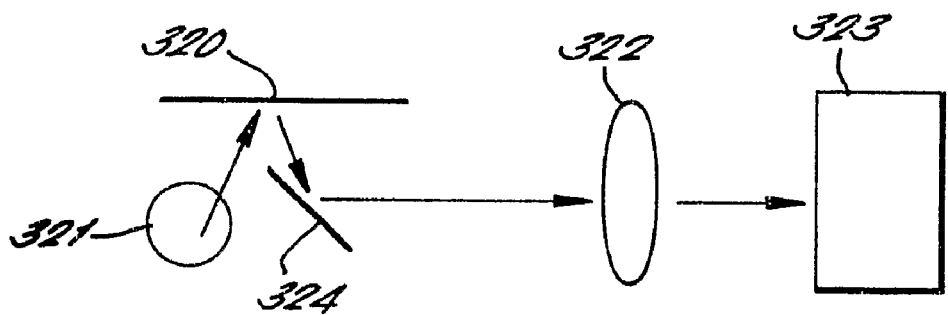

The purpose of the recognition means 252 is to allow the machine 201 to recognise the type of beverage cartridge 1 that has been inserted and to adjust one or more operational parameters accordingly. In a typical embodiment, the recognition means 252 comprises an optical barcode reader which reads a printed barcode 320 provided on the laminate 5 of the beverage cartridge 1 as shown in FIG. 10. The barcode 320 is formed from a plurality of bars of contrasting colour. Preferably the bars are black on a white background to maximise the contrast. The barcode 320 is not required to conform to a published standard but a standard format for barcodes, such as EAN-13, UPC-A, or Interleaf 2 of 5 may be used. The optical barcode reader comprises one or more LEDs 321 to illuminate the barcode 320, a focusing lens 322 to acquire an image of the barcode, a charge coupled device (CCD) 323 for producing an electrical signal representative of the acquired image and support circuitry for the LEDs and CCD. The space in the lower part for accommodating the barcode reader is limited. A mirror or mirrors 324 may be used to reflect the light from the LEDs 321 to a focussing lens which is not located in the lower part 255. Schematic arrangements are shown in FIGS. 9a and 9b. The lower part 255 comprises an aperture 326 which is the same size as the barcode 320 on the beverage cartridge 1. The aperture 326 is closed by a window, preferably glass, which can transmit the signals produced by the bar code reader. In use the electrical signals produced are decoded by signal processing software and the results forwarded to the control processor. The software can recognise whether the read of the barcode contained errors. The barcode 320 may be rescanned a number of times before an error message is presented to the consumer. If the machine 201 is unable to read the barcode the consumer is able to use the beverage cartridge 1 to dispense a beverage using a manual mode of operation. Alternatively, the cartridge 1 may comprise an RFID code for reading by an RFID reader.

The brew head 250 may also include a cartridge sensor for detecting whether a cartridge is present in the holder 251.

The brew head 250 may also include a lock sensor which detects whether the holder 251 is properly closed. Preferably the lock sensor comprises a micro-switch which is triggered when the holder 251 is closed and locked. Preferably the cartridge sensor and lock sensor are connected in series such that the output of both sensors must be satisfactory, i.e. cartridge present and mechanism locked, before the dispense cycle can be commenced.

Operation of the machine 201 comprises insertion of a beverage cartridge 1 into the brew head 250, carrying out a dispense cycle in which the beverage is dispensed and removal of the cartridge 1 from the machine.

The operational behaviour of the machine 201 is determined by software embedded in the control processor.

To insert the cartridge 1 the holder 251 is opened as described above to expose the cartridge mount 257. The cartridge 1 is then placed on the cartridge mount 257 received within the recess 290 such that the handle 24 of the cartridge is located in the irregularity 291. The optical or magnetic barcode 320 of the cartridge 1 is orientated directly above the aperture 326 in the cartridge mount 257. The holder 251 is then closed by operation of the clamping lever as described above. During closure the inlet and outlet piercers 253, 254 pierce the laminate 5 of the cartridge 1 to form the cartridge inlet 121 and outlet 122. As described above the laminate 5 cut by the outlet piercer 254 is folded up into the annulus surrounding the discharge spout 43. When closed the holder 251 grips the cartridge 1 around the rim 35 between the cartridge mount 257 and the upper part 256 and/or between the window 311 and the top 11 of the cartridge 1 to form a fluid tight seal of sufficient integrity to withstand the pressures developed during the dispense cycle.

To commence the operating cycle the consumer operates the start/stop button 241.

The operating cycle comprises the steps of cartridge recognition and the discharge cycle.

Cartridge recognition is performed by the optical recognition means 252 as described above assuming that the outputs from the cartridge sensor and lock sensor are satisfactory. Once the barcode 320 or RFID has been decoded the operational parameters of the machine 201 are adjusted by the control processor. The discharge cycle is then automatically commenced.

The discharge cycle has four main stages, not all of which are used for all beverage types:
(i) Pre-wet
(ii) Pause
(iii) Brew/Mixing
(iv) Purge In the pre-wet stage the cartridge 1 is charged with water from the water storage tank 220 by means of the water pump 230. The charging with water causes the beverage ingredients 200 in the filtration chamber 130 to be wetted. The charging may take place at a "fast" flow rate of 600 ml/min or a "slow" flow rate of 325 ml/min. The slow charging rate is particularly useful for cartridges containing viscous liquid beverage ingredients where the ingredients require some dilution before they are able to be pumped at a higher volume flow rate. The volume of water injected into the cartridge 1 is selected to ensure that water or beverage does not drip out of the cartridge outlet 122 during this stage.

The pause stage allows the beverage ingredients 200 to soak in the water injected during the pre-wet stage for a predetermined period of time. Both the pre-wetting and soaking stages are known to increase the yield of the extractibles from the beverage ingredients 200 and to improve the end flavour of the beverage. Pre-wetting and soaking are particularly used where the beverage ingredients are roast and ground coffee.

In the brew/mixing stage water is passed through the cartridge 1 in order to produce the beverage from the beverage ingredients 200. The temperature of the water is determined by the control processor which sends instructions to the water heater 225 to heat the water passing from the water tank 220 to the brew head 250. Water enters the lower part 255 of the holder 251 through the conduit 262 via the inlet valve and the inlet piercer 253 into the inlet chamber 126 of the beverage cartridge 1. Brewing and/or mixing and subsequent dispensing of the beverage from the beverage cartridge 1 is as described above with reference to the versions of the beverage cartridge 1.

The air purge comprises the blowing of pressurised air through the beverage preparation machine and the beverage cartridge 1 to ensure that all beverage is dispensed and that the flow path is cleared ready for dispensing another beverage. The air purge does not commence immediately on cessation of the brew/mixing stage to allow for the majority of the fluid to clear the flow path. This prevents an unacceptable spike in internal pressure on commencement of the air purge.

In normal operation a user manually stops the machine 201 by operating the start/stop button 241.

Once the operating cycle has been completed the consumer removes the cartridge 1 by opening the holder 251 and manually removing and disposing of the cartridge. Alternatively, the machine 201 may be provided with an automatic ejection mechanism for removing the cartridge automatically on opening the holder 251.

Insert for Use in the System

Figure 22:
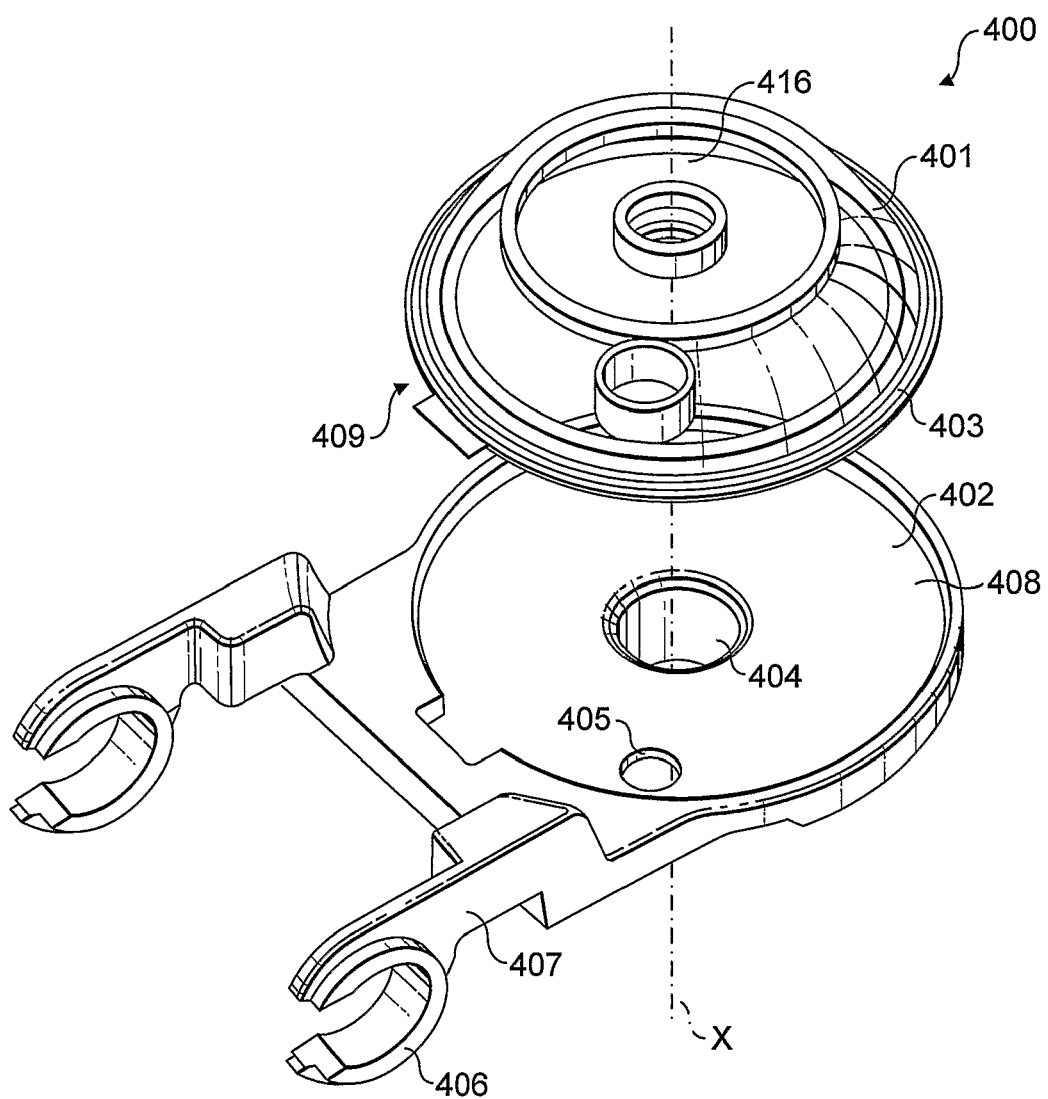
FIG. 22 is a perspective view from above of an insert according to the present invention showing upper and lower parts thereof separated.

The insert 400 according to an aspect of the present invention for use in the beverage preparation machine described above is shown in FIGS. 22 to 24.

The insert 400 comprises an upper part 401 and a lower part 402. The upper part 401 in the illustrated embodiment is generally in the form of the outer member 2 described above with reference to the cartridge 1. However, it will be apparent that other shapes and forms of upper part may be used. The upper part 401 does not contain an inner member but is substantially hollow having a downwardly directed opening 409. Sealing means in the form of a rubberised or elastomeric 'O' ring 403 is inserted or attached to a rim of the opening 409 of the upper part 401. The O-ring 403 may be releasable or permanently attached to the upper part 401. Alternatively, the O-ring 402 may be attached to the lower part 402.

Figure 23:
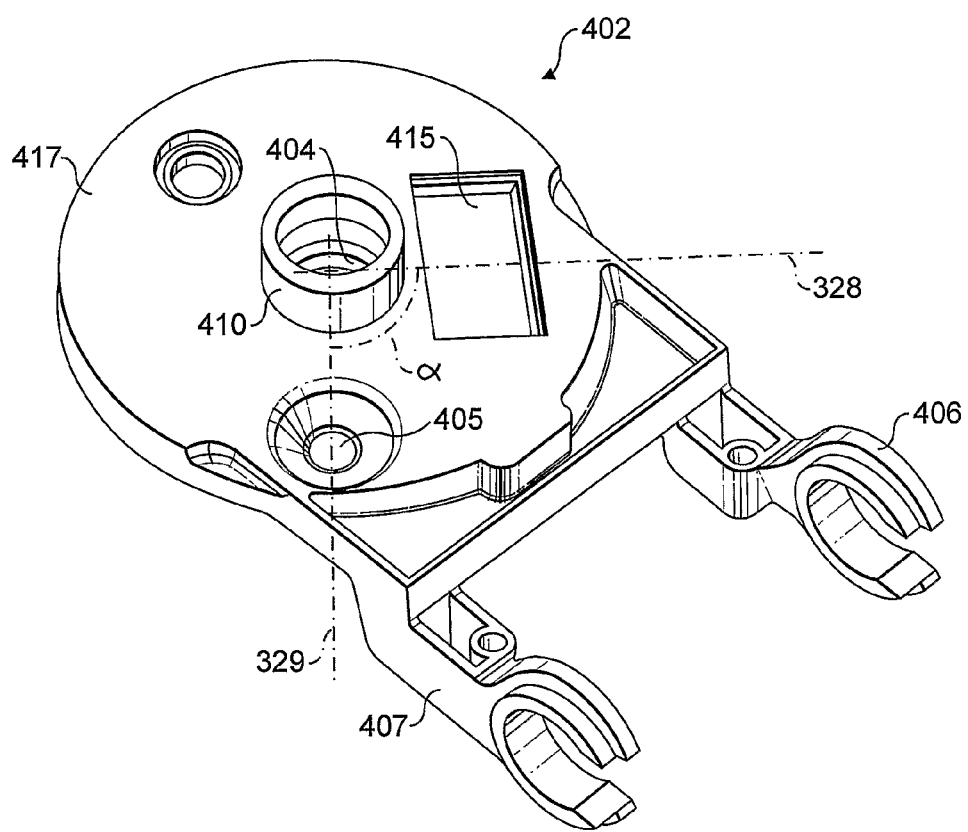
FIG. 23 is a perspective view from below of the lower part of the insert of FIG. 22.

The lower part 402 is generally in the form of the mount 257 described above. In particular, the lower part 402 comprises a generally planer portion having a circular recess 408 for receiving the upper part 401 as will be described below. In addition, the lower part 402 comprises two dependent legs 407 having C-shaped clipping means 406 at their distil ends for attachment to the pivot axis of the beverage preparation machine 201 in the same manner as described above for attachment of the mount 257 of the beverage preparation machine 201. The lower part 402 is provided with an inlet aperture 405 near a periphery of the recess 408 and an outlet aperture 404 at a centre of the recess 408. FIG. 23 illustrates the underneath view of the lower part 402 of the insert 400. As shown, the inlet aperture 405 may be surrounded by a dished recess. Alternatively, the inlet aperture 405 may be a simple hole in a flat planar surface. The lower surface 417 of the lower part 402 is also provided with a recess 415 for receiving a barcode or RFID for reading by the barcode reader or RFID reader of the beverage preparation machine 201 in the same manner as the reading of the barcode or RFID of the cartridge 1 as described above. Alternatively, the barcode may be applied directly to the lower surface 417 of the lower part 402 without the need for a recess 415.

Figure 25:
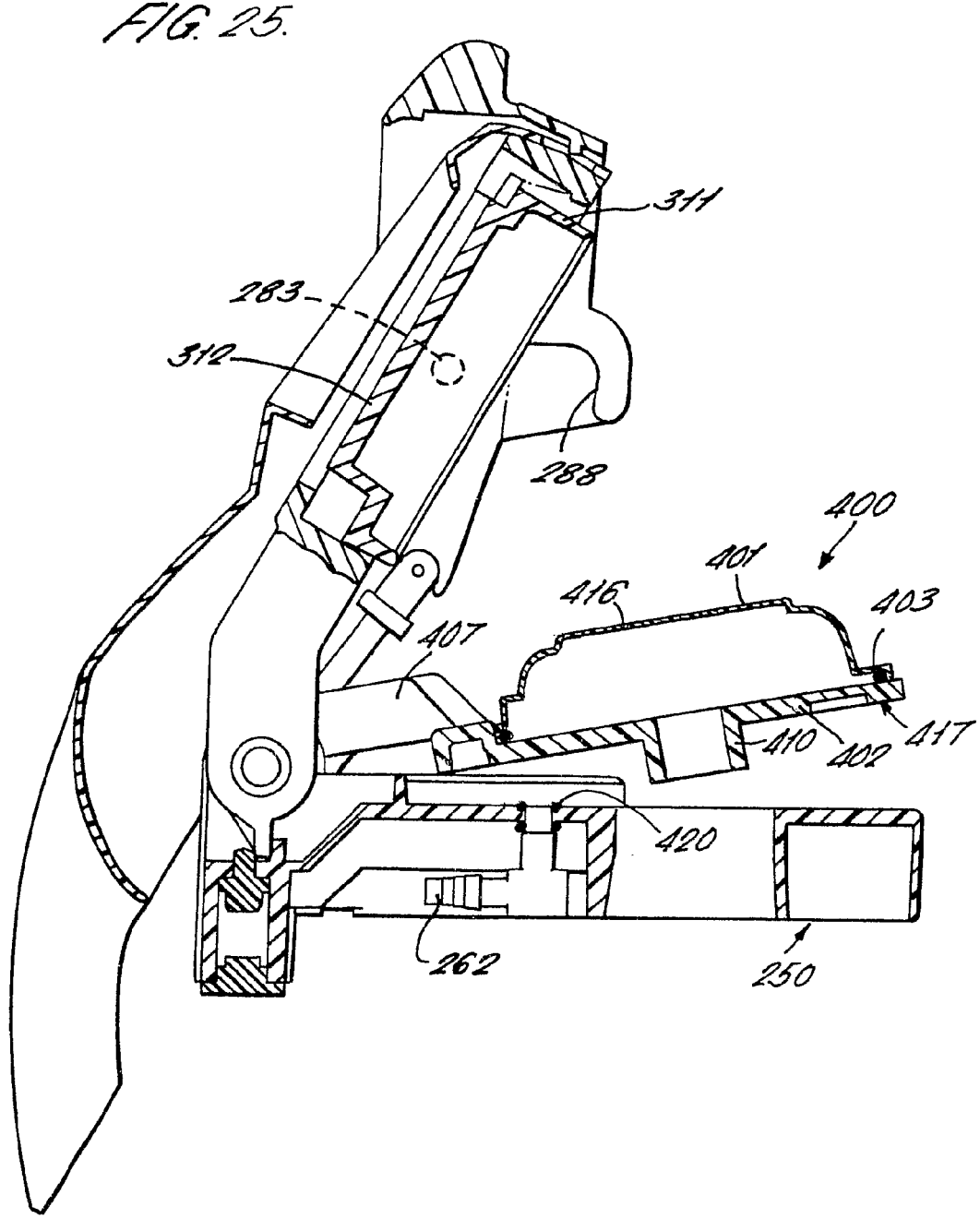
FIG. 25 is a cross-sectional view of the brew head of the beverage preparation machine in an open position illustrated accommodating the insert of FIG. 22.

The outlet aperture 404 of the lower part 402 is provided with a downwardly dependent cylindrical extension 410 which, as shown in FIG. 25 is accommodated on closure of the brew head by removing the removable inlet and outlet piercers 253, 254.

Figure 24:
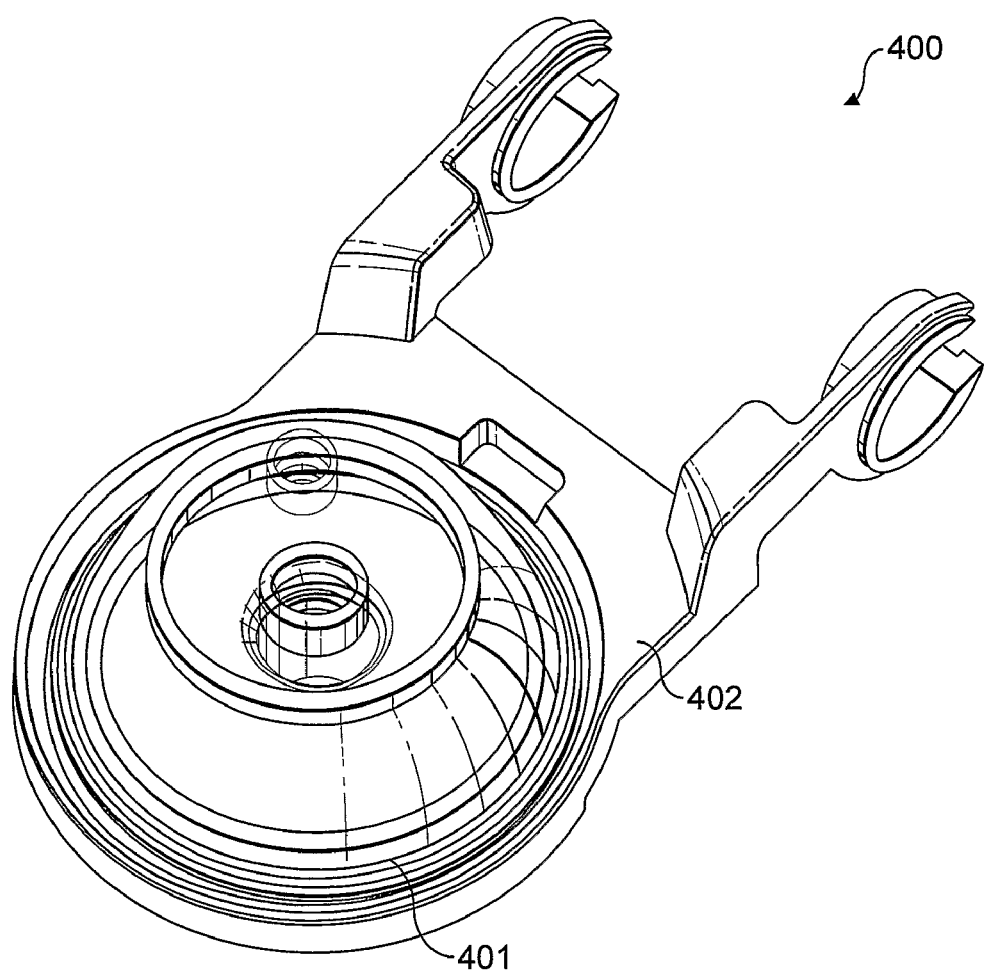
FIG. 24 is a perspective view from above of the insert of FIG. 22 showing the upper and lower parts sealed together.

In use, the upper part 401 and lower part 402 of the insert 400 are sealed together as shown in FIG. 24 to define a brewing volume in between having an inlet provided by the inlet aperture 405 of the lower part 402 and an outlet provided by the outlet aperture 404 of the lower part 402. It will be appreciated that the inlet to the brewing volume is upwardly directed and the outlet from the brewing volume is downwardly directed.

When the upper part 401 and lower part 402 are sealed together, the 'O' ring 403 provides a peripheral seal surrounding the brewing volume to prevent leakage of fluid at the extremities of the insert 400.

As shown in FIG. 25, the insert 400 may be inserted into the beverage preparation machine of the type described above in place of the rotatable mount 257 and the removable inlet and outlet piercers 253, 254. As with the mount 257, the insert 400 is rotatable about the pivot access of the beverage preparation machine.

In use, a quantity of beverage ingredients is loaded into the brewing volume defined by the insert 400 by placing the beverage ingredients between the upper part 401 and lower part 402 and then placing the upper part 401 and lower part 402 together so as to seal the brewing volume by means of the 'O' ring 403. This loading operation may take place before or after the insert 400 is removably attached to the beverage preparation machine. Preferably, the lower part 402 of the insert 400 remains attached to the beverage preparation machine 201 and the user loads the quantity of beverage ingredients onto the lower part 402 and then places the upper part 401 on top of the lower part 402 in the recess 408 to define and seal the brewing volume.

Operation of the closure mechanism of the beverage preparation machine is exactly the same as described above. In particular, it should be noted that on closure of the closure mechanism the brew head applies a downward pressure on the upper part 401 of the insert 400 to hold the upper part 401 and lower part 402 together to create the seal therebetween. The pressure may be applied to the upper part 401 by the top portion of the viewing window 311 or by the downwardly dependent rim of the viewing window dependent on the construction of the upper part 401. In addition, the downwardly directed pressure applied by the closure mechanism of the beverage preparation machine seals the lower part 402 of the insert 400 against the fixed lower part 255 of the brew head ensuring a seal between the inlet aperture 405 of the lower part 402 and the upwardly directed inlet of the brew head to ensure that water does not leak during dispensation at this point. Preferably the lower part 255 of the brew head 250 at the inlet is provided with a rubberised seal 420 which stands slightly proud of the plane of the lower part 255 to create an improved seal between the upwardly directed inlet and the lower surface 417 of the lower part 402 of the insert 400.

The quantity of beverage ingredients loaded into the brewing volume of the insert 400 may be loose or may be contained in a container such as a flexible filter bag made of filter paper. Use of a filter bag has the advantage that loading of the beverage ingredients is very quick and removal of the beverage ingredients after dispensation is made easier.

During dispensation the beverage preparation machine injects water upwardly into the brewing volume from the upwardly directed inlet of the brew head 250. The water mixes with the quantity of beverage ingredients held in the brewing volume and the resulting beverage is dispensed downwardly through the outlet aperture 404 into a receptacle situated below the brew head 250. Other aspects of the operation of the beverage preparation machine are as described above in respect of operation of the cartridge. In particular, the recognition means of the beverage preparation machine may be used to read a barcode or RFID situated on the lower surface of the lower part 402, preferably in the recess 415.

The insert 400 has been described particularly for use with beverage ingredients contained in containers such as filter bags. As indicated, the beverage ingredients may alternatively be in a loose form. In this case, a separate filter may be provided in the insert 400 to prevent discharge of beverage ingredient residue. A preferred arrangement is for a planer filter to be placed across the upper extremity of the outlet aperture 404 of the lower part 402.

It will be appreciated that it will be advantageous that the upper part 401 of the insert 400 is rigid or semi-rigid in order to be able to transfer the downward pressure created by the closure mechanism to the seal 403 to ensure a good seal between the upper part 401 and lower part 402 of the insert 400.

In the illustrated embodiment of the insert 400, the upper part 401 and lower part 402 are shown as separate items. In an alternative configuration, the upper part 401 and lower part 402 may be hinged together at one point but movable from an open position and a closed position to allow loading and unloading of the quantity of beverage ingredients. Preferably, this version of the insert 400 would be formed as a plastic moulding with a plastic hinge.

Flow through the insert 400 is generally in an inward direction from the inlet 405 to the outlet 404. Also, advantageously since the inlet 405 and outlet 404 are both provided in the lower part 402, the construction of the upper part 401 is simplified.

In the above description the insert has been described as defining a brew volume. It should be understood that the insert and beverage preparation machine may be used with beverage ingredients which do not require brewing but are, instead, dissolved, diluted or otherwise mixed with water without departing from the scope of the present invention.

The insert has been specifically described in the above example as a replacement for the mount 257 of the machine 201. However, it will be understood that the insert may take the form of any item insertable into the beverage preparation machine, whether attached thereto or not, to allow dispensation of beverage ingredients in loose form or where contained in containers such as, but not limited to, flexible bags as set out in the following claims.

The invention claimed is:

1. An insert for use in a beverage preparation machine of a type comprising a brew head suitable for receiving a rigid or semi-rigid cartridge, the brew head comprising an upwardly directed inlet for supplying water to the brew head and a downwardly directed outlet for outflow of beverage produced by the machine, the insert comprising an upper part, a lower part and sealing means, the upper and lower parts being moveable between an open configuration in which a quantity of beverage ingredients may be loaded into the insert and a closed configuration in which the upper and lower parts are sealed together by the sealing means to define therebetween a brewing volume containing, in use, the quantity of beverage ingredients, the lower part comprising an inlet and an outlet arranged to communicate respectively with the inlet and outlet of the brew head of the beverage preparation machine when the insert is inserted into the machine such that, in use, water from the inlet of the brew head passes upwardly through the inlet of the insert into the brewing volume and such that beverage produced from the water and the quantity of beverage ingredients passes downwardly through the outlet of the insert to flow out of the outlet of the brew head, wherein the inlet and outlet of the insert are coplanar.

2. An insert as claimed in claim 1 wherein the quantity of beverage ingredients loaded in use into the insert are loose.

3. An insert as claimed in claim 2 wherein the insert comprises filtering means between the brewing volume and the outlet of the insert.

4. An insert as claimed in claim 1 wherein the quantity of beverage ingredients loaded in use into the insert are contained in a container comprising filtering means.

5. An insert as claimed in claim 4 wherein the container is flexible.

6. An insert as claimed in claim 5 wherein the container is formed at least in part from a filter paper or filtering membrane.

7. An insert as claimed in claim 6, wherein the container is a filter bag.

8. An insert as claimed in claim 4 wherein the container is a rigid or semi-rigid cartridge.

9. An insert as claimed in claim 8 wherein the cartridge is any of semi-spherical, cylindrical, round or square in shape.

10. An insert as claimed in claim 9, wherein the sealing means is located on or in the upper part of the insert.

11. An insert as claimed in claim 10, wherein the sealing means is located on or in the lower part of the insert.

12. An insert as claimed in any preceding claim 11, wherein the sealing means comprises a ring seal for sealing around a periphery of the brewing volume.

13. An insert as claimed in claim 12 wherein the sealing means comprises an O-ring.

14. An insert as claimed in claim 13, wherein the sealing means is formed from an elastomeric material.

15. An insert as claimed in claim 14, wherein the upper part and lower part are disconnected from one another.

16. An insert as claimed in claim 15 wherein the upper part and lower part comprise co-operating formations to permit snap-fitting together of the upper part and lower part.

17. An insert as claimed in claim 15 wherein the upper part and lower part are joined by a hinge allowing the upper and lower parts to move between the open and closed configurations.

18. An insert as claimed in claim 17, wherein the upper part of the insert is rigid or semi-rigid such that pressure applied, in use, to the upper part of the insert by a closure mechanism of the beverage preparation machine on closing of said closure mechanism squeezes the upper and lower parts of the insert together with sufficient force for the sealing means to seal together the upper and lower parts.

19. An insert as claimed in claim 18, wherein the upper part of the insert is rigid or semi-rigid such that pressure applied, in use, to the upper part of the insert by a closure mechanism of the beverage preparation machine on closing of said closure mechanism seals the lower part of the insert against the inlet of the brew head of the beverage preparation machine.

20. An insert as claimed in any preceding claim 19, wherein the upper part is in the form of a domed shell.

21. An insert as claimed in claim 20, wherein the lower part of the insert is formed as one piece.

22. An insert as claimed in claim 20, wherein the lower part of the insert is formed from more than one piece.

23. An insert as claimed in claim 22, wherein the insert is disc-shaped.

24. An insert as claimed in claim 23, formed from plastic.

25. An insert as claimed in claim 1, further comprising an aperture for receiving on insertion of the insert in the beverage machine a window of a bar code reader or RFID reader of said machine.

26. An insert as claimed in claim 25 wherein the aperture is coplanar with the inlet and outlet of the insert.

27. An insert as claimed in claim 26, wherein the inlet of the insert is located at or near a periphery of the lower part and the outlet of the insert is located at a centre of the lower part.

28. An insert as claimed in claim 27, wherein, in use, flow through the insert is from the inlet to the outlet.

29. An insert as claimed in claim 28 wherein, in use, flow through the insert is generally in an inward direction from the inlet to the outlet.

30. An insert as claimed in claim 29, further comprising rotatable means for rotatably attaching the insert to the beverage preparation machine.

31. An insert as claimed in claim 30 wherein the rotatable means allows the insert to be rotated on closure of a closure mechanism of the beverage preparation machine into a horizontal orientation such that the lower part is sealed against the inlet of the brew head.

32. An insert as claimed in claim 31 wherein the rotatable means comprises one or more legs which are attachable to, and rotatable about, one or more pivot points of the brew head.

33. An insert as claimed in claim 32, further comprising coding means for controlling operation of said beverage preparation machine.

34. An insert as claimed in claim 33 wherein the coding means comprises a bar code or radio frequency identification device (RFID).

35. An insert for use in a beverage preparation machine of a type comprising a brew head suitable for receiving a rigid or semi-rigid cartridge, the brew head comprising an upwardly directed inlet for supplying water to the brew head and a downwardly directed outlet for outflow of beverage produced by the machine, the insert comprising an upper part, a lower part and sealing means, the upper and lower parts being moveable between an open configuration in which a quantity of beverage ingredients may be loaded into the insert and a closed configuration in which the upper and lower parts are sealed together by the sealing means to define therebetween a brewing volume containing, in use, the quantity of beverage ingredients, the lower part comprising an inlet and an outlet arranged to communicate respectively with the inlet and outlet of the brew head of the beverage preparation machine when the insert is inserted into the machine such that, in use, water from the inlet of the brew head passes upwardly through the inlet of the insert into the brewing volume and such that beverage produced from the water and the quantity of beverage ingredients passes downwardly through the outlet of the insert to flow out of the outlet of the brew head, wherein the lower part of the insert has a generally planar surface facing the brew volume and comprises the inlet and the outlet of the insert.

36. An insert as claimed in claim 35 wherein the quantity of beverage ingredients loaded in use into the insert are loose.

37. An insert as claimed in claim 35 wherein the insert comprises filtering means between the brewing volume and the outlet of the insert.

38. An insert as claimed in claim 35 wherein the quantity of beverage ingredients loaded in use into the insert are contained in a container comprising filtering means.

39. An insert as claimed in claim 35 wherein the container is formed at least in part from a filter paper or filtering membrane.

40. An insert as claimed in claim 35 wherein the cartridge is any of semi-spherical, cylindrical, round or square in shape.

41. An insert as claimed in claim 35, wherein the sealing means is located on or in the upper part of the insert.

42. An insert as claimed in claim 35, wherein the sealing means is located on or in the lower part of the insert.

43. An insert as claimed in claim 35, wherein the upper part and lower part are disconnected from one another.

44. An insert as claimed in claim 35 wherein the upper part and lower part comprise co-operating formations to permit snap-fitting together of the upper part and lower part.

45. An insert as claimed in claim 35 wherein the upper part and lower part are joined by a hinge allowing the upper and lower parts to move between the open and closed configurations.

46. An insert as claimed in claim 35, wherein the upper part of the insert is rigid or semi-rigid such that pressure applied, in use, to the upper part of the insert by a closure mechanism of the beverage preparation machine on closing of said closure mechanism squeezes the upper and lower parts of the insert together with sufficient force for the sealing means to seal together the upper and lower parts.

47. An insert as claimed in claim 35, wherein the upper part of the insert is rigid or semi-rigid such that pressure applied, in use, to the upper part of the insert by a closure mechanism of the beverage preparation machine on closing of said closure mechanism seals the lower part of the insert against the inlet of the brew head of the beverage preparation machine.

48. An insert as claimed in claim 35, wherein the inlet of the insert is located at or near a periphery of the lower part and the outlet of the insert is located at a centre of the lower part.

49. An insert as claimed in claim 35, further comprising coding means for controlling operation of said beverage preparation machine.

50. An insert as claimed in claim 49, wherein the coding means comprises a bar code or radio frequency identification device (RFID).

* * * * *

UNITED STATES PATENT AND TRADEMARK OFFICE
CERTIFICATE OF CORRECTION

Page 1 of 1

PATENT NO. : 8,033,211 B2
APPLICATION NO. : 10/589459
DATED : October 11, 2011
INVENTOR(S) : Andrew Michael Halliday et al.

It is certified that error appears in the above-identified patent and that said Letters Patent is hereby corrected as shown below:

On the Title Page, delete "(22) Filed:   Aug. 14, 2006" and insert in its place the following:

| | | |
|---|---|---|
| Item --(22) | PCT Filed: | Feb. 11, 2005 |
| (86) | PCT No.: | PCT/GB05/000476 |
| | §371 (c)(1), (2), (4) Date: | Aug. 14, 2006 |
| (87) | PCT Pub. No.: | WO2005/079639 |
| | PCT Pub. Date: | Sep. 1, 2005--. |

IN THE CLAIMS:

Column 21, line 37, in claim 12, before "claim" delete "any preceding".

Column 21, line 66, in claim 20, before "claim" delete "any preceding".

Signed and Sealed this
Thirteenth Day of March, 2012

David J. Kappos
*Director of the United States Patent and Trademark Office*